US007866561B2

(12) United States Patent
Tanaka

(10) Patent No.: US 7,866,561 B2
(45) Date of Patent: Jan. 11, 2011

(54) LABEL PRODUCING APPARATUS

(75) Inventor: Mitsugi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 699 days.

(21) Appl. No.: 11/673,435

(22) Filed: Feb. 9, 2007

(65) Prior Publication Data

US 2007/0131769 A1 Jun. 14, 2007

Related U.S. Application Data

(63) Continuation-in-part of application No. PCT/JP2005/014720, filed on Aug. 11, 2005.

(30) Foreign Application Priority Data

Aug. 12, 2004 (JP) ............................ 2004-235055

(51) Int. Cl.
*G06K 19/06* (2006.01)

(52) U.S. Cl. .................. 235/492; 340/572.1; 340/572.7

(58) Field of Classification Search ................. 235/439, 235/487, 492; 340/572.1, 572.7, 572.8; 400/76, 400/191, 247

See application file for complete search history.

(56) References Cited

U.S. PATENT DOCUMENTS

| | | | | |
|---|---|---|---|---|
| 6,147,662 | A * | 11/2000 | Grabau et al. | 340/572.1 |
| 6,593,853 | B1 * | 7/2003 | Barrett et al. | 340/572.1 |
| 6,899,476 | B1 * | 5/2005 | Barrus et al. | 400/76 |
| 7,360,714 | B2 * | 4/2008 | Sano et al. | 235/492 |
| 7,416,121 | B2 * | 8/2008 | Zimmerman | 235/385 |
| 2003/0189490 | A1 * | 10/2003 | Hogerton et al. | 340/572.8 |
| 2005/0194442 | A1 * | 9/2005 | Adams et al. | 235/439 |
| 2006/0118229 | A1 * | 6/2006 | Ohashi et al. | 156/60 |
| 2006/0214802 | A1 * | 9/2006 | Posamentier | 340/572.8 |

FOREIGN PATENT DOCUMENTS

| | | |
|---|---|---|
| JP | 2002-211075 A | 7/2002 |
| JP | 2003-159838 A | 6/2003 |
| JP | 2003-211566 A | 7/2003 |

OTHER PUBLICATIONS

Japan Patent Office; Notice of Reasons for Rejection in Japanese Patent Application No. 2006-531714 (counterpart to the above-captioned U.S. patent application) mailed May 31, 2010.

* cited by examiner

*Primary Examiner*—Steven S Paik
*Assistant Examiner*—William M Anderson, Jr.
(74) *Attorney, Agent, or Firm*—Baker Botts L.L.P.

(57) ABSTRACT

A label producing apparatus includes a pressure bonding roller configured to produce a printed tag label tape by bonding a print-receiving tape paid out from a print-receiving tape roll to a base tape having a plurality of RFID circuit elements and paid out from a cover tape roll, a signal processing circuit configured to create RFID control information to be written to IC circuit parts and a transmitting portion of a radio frequency circuit, an antenna configured to write the thus created RFID control information disposed upstream of the pressure bonding roller in the transport direction of the base tape, and a print head configured to carry out print to the RFID circuit elements disposed upstream of the pressure bonding roller in the transport direction of the print-receiving tape 103. Accordingly, the RFID circuit elements are disposed on the tape at close intervals, and read/write processing can be carried out effectively and continuously.

11 Claims, 15 Drawing Sheets

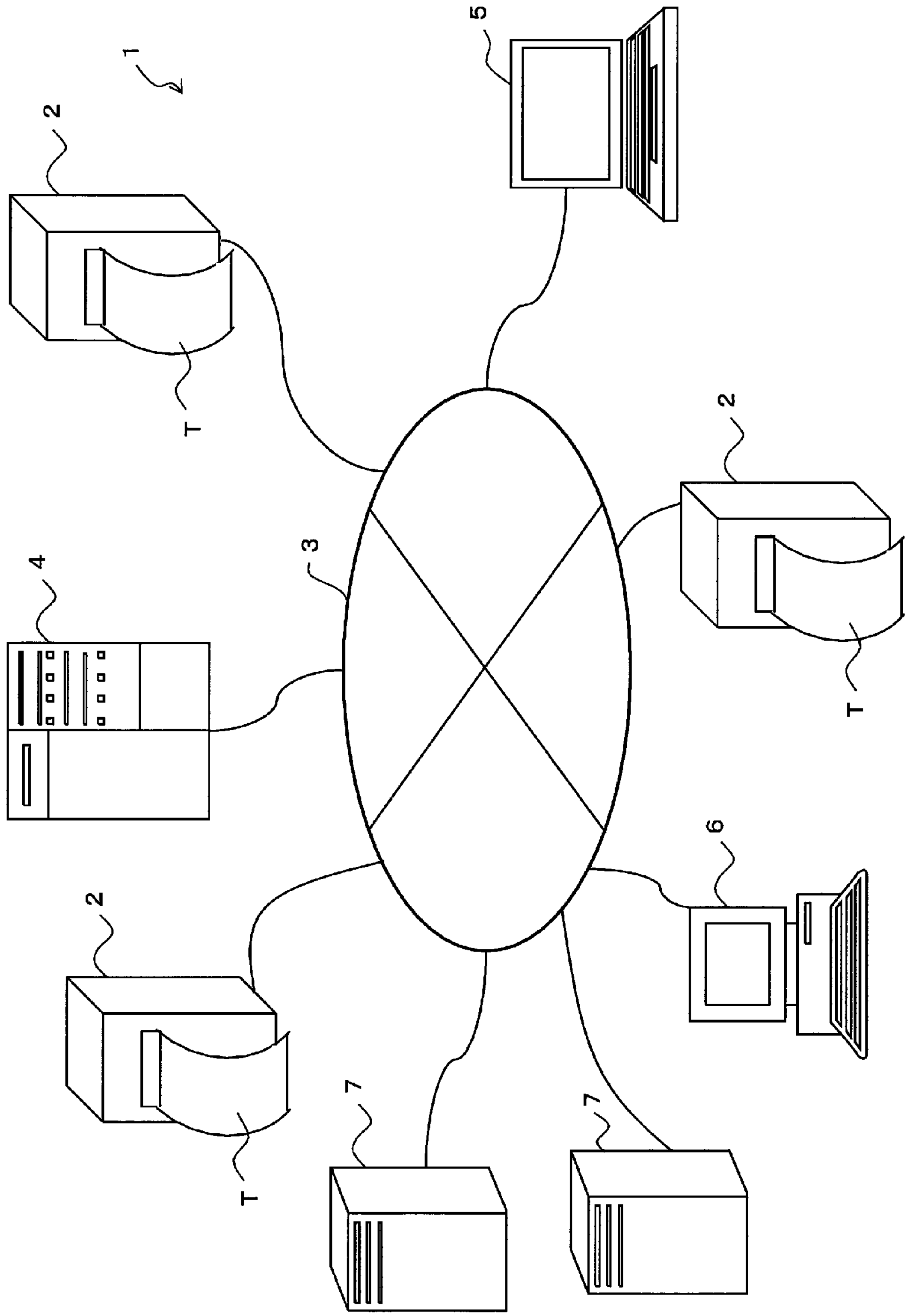
【FIG.1】

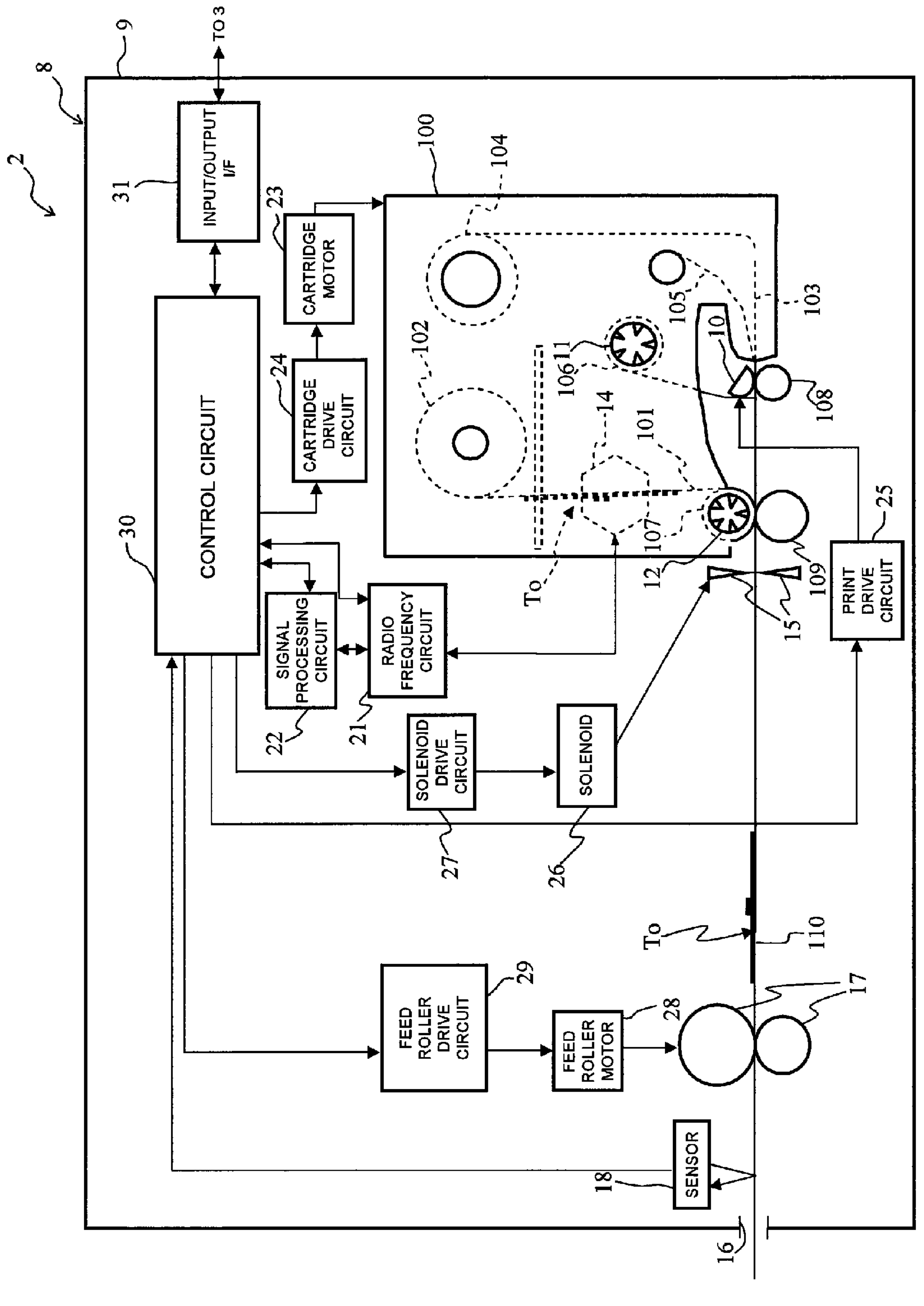
【FIG.2】

【FIG.3】
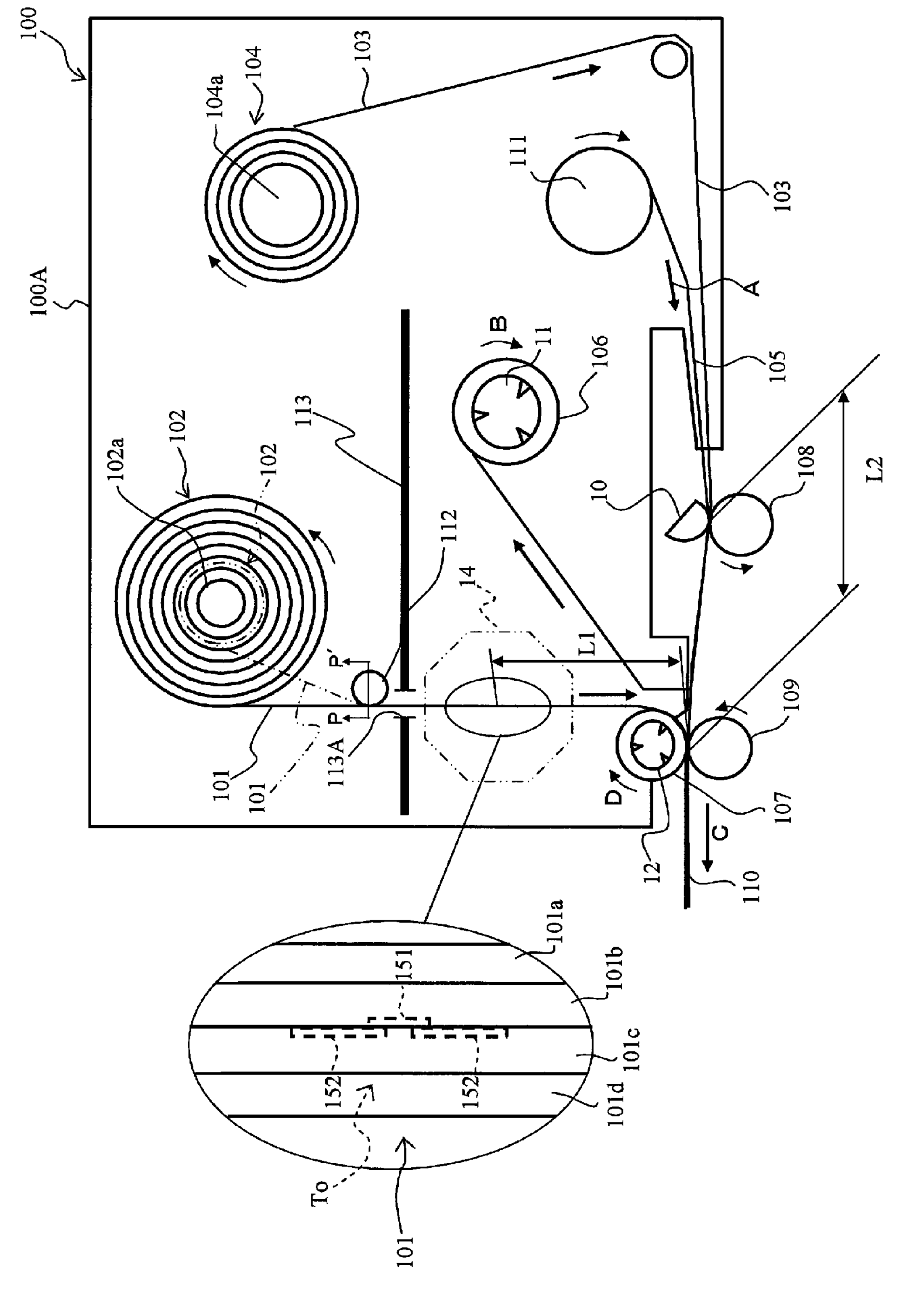

【FIG.4】
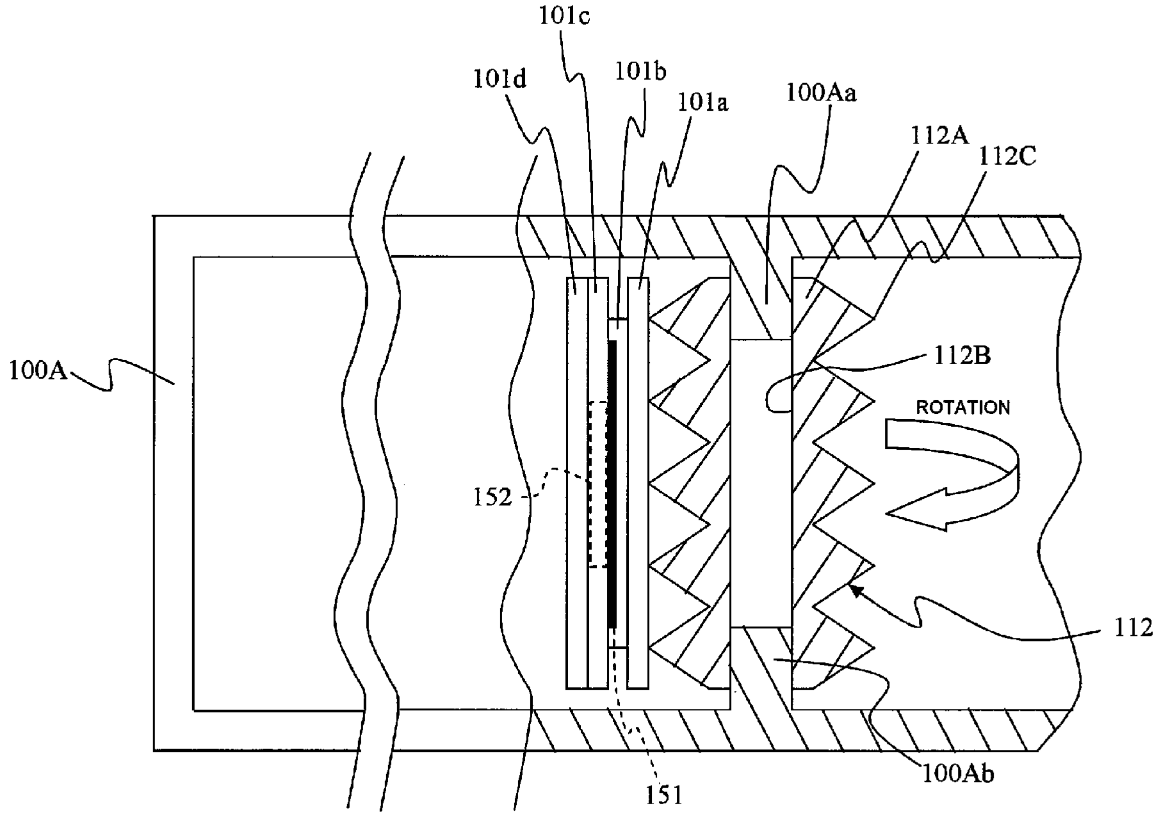

【FIG.5】
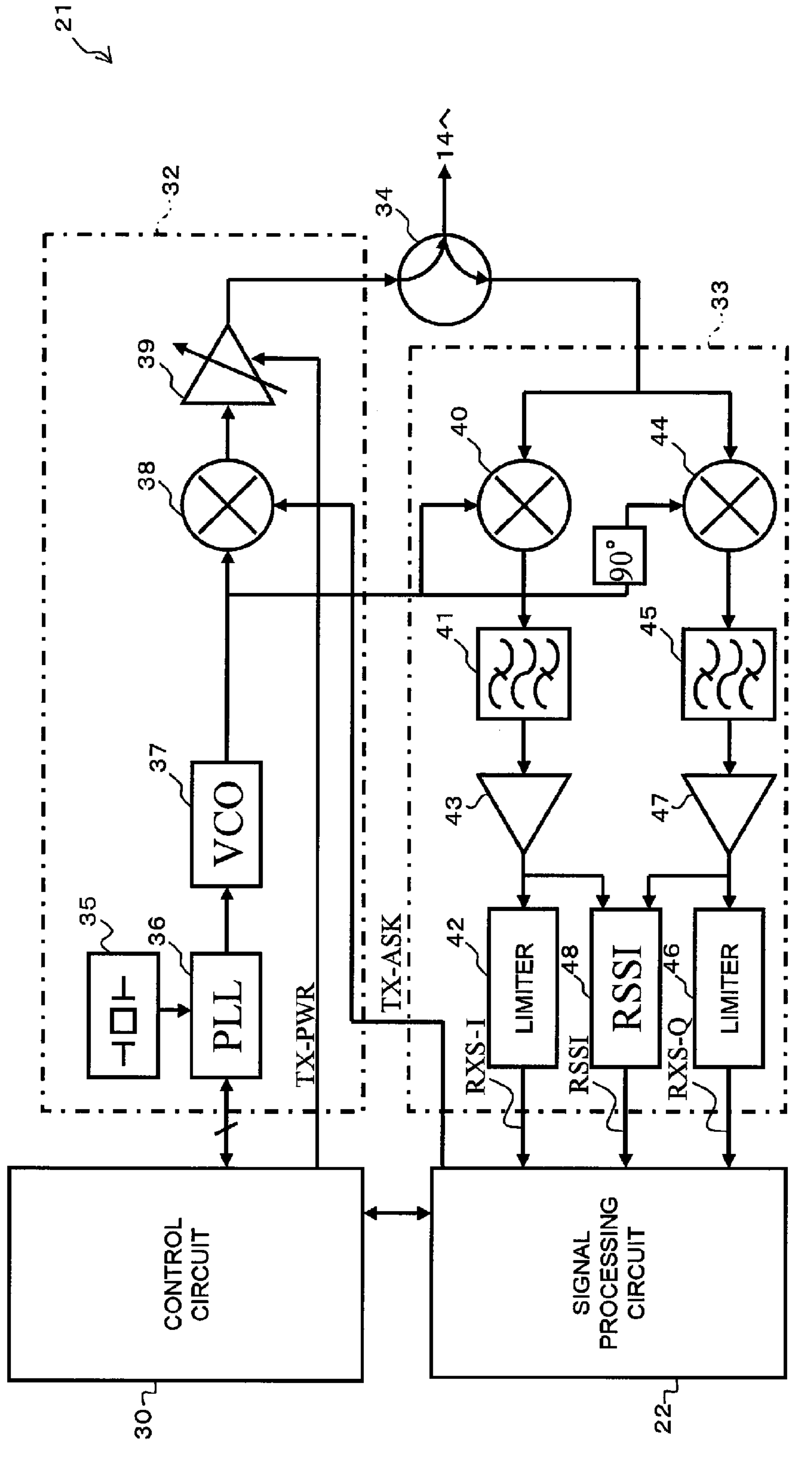

【FIG.6】
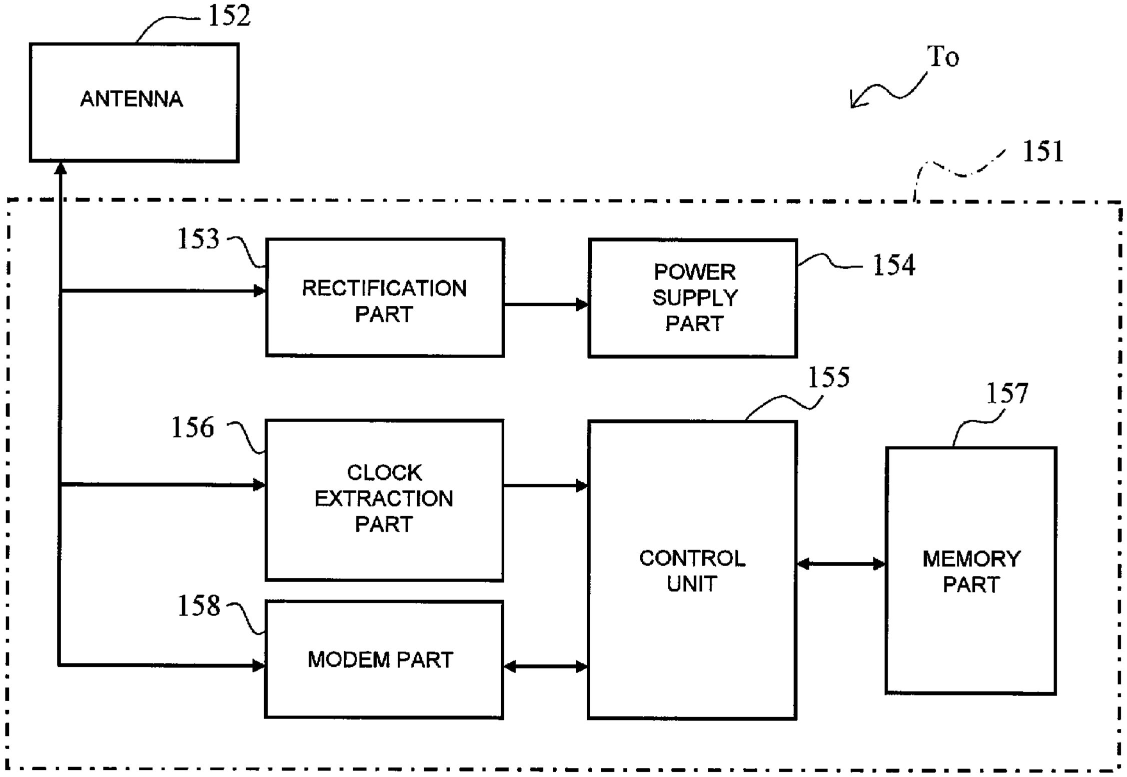

【FIG.7A】
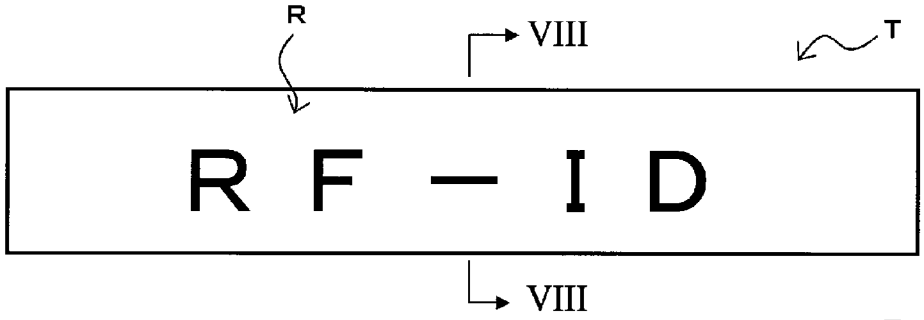
【FIG.7B】
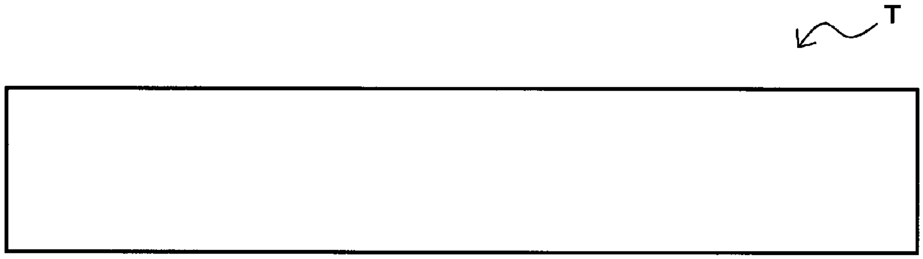
【FIG.8】
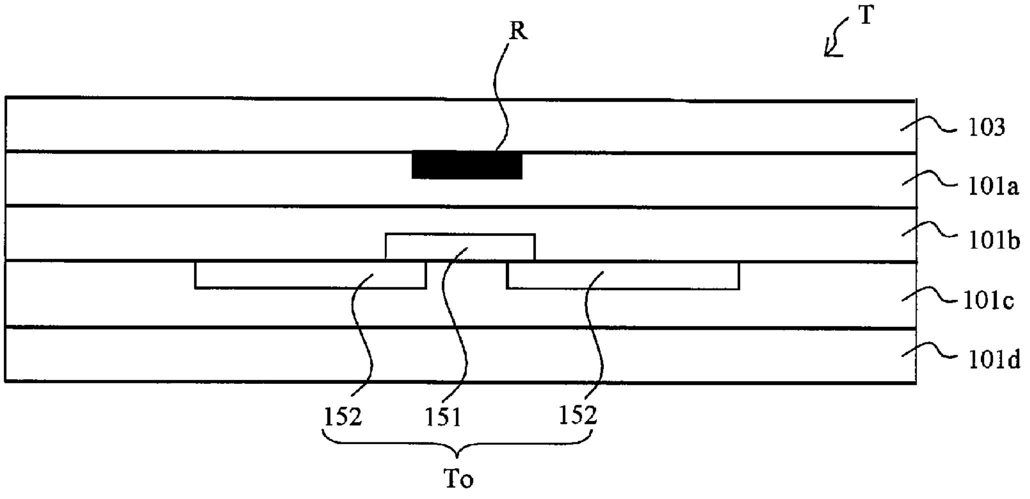

【FIG.9】
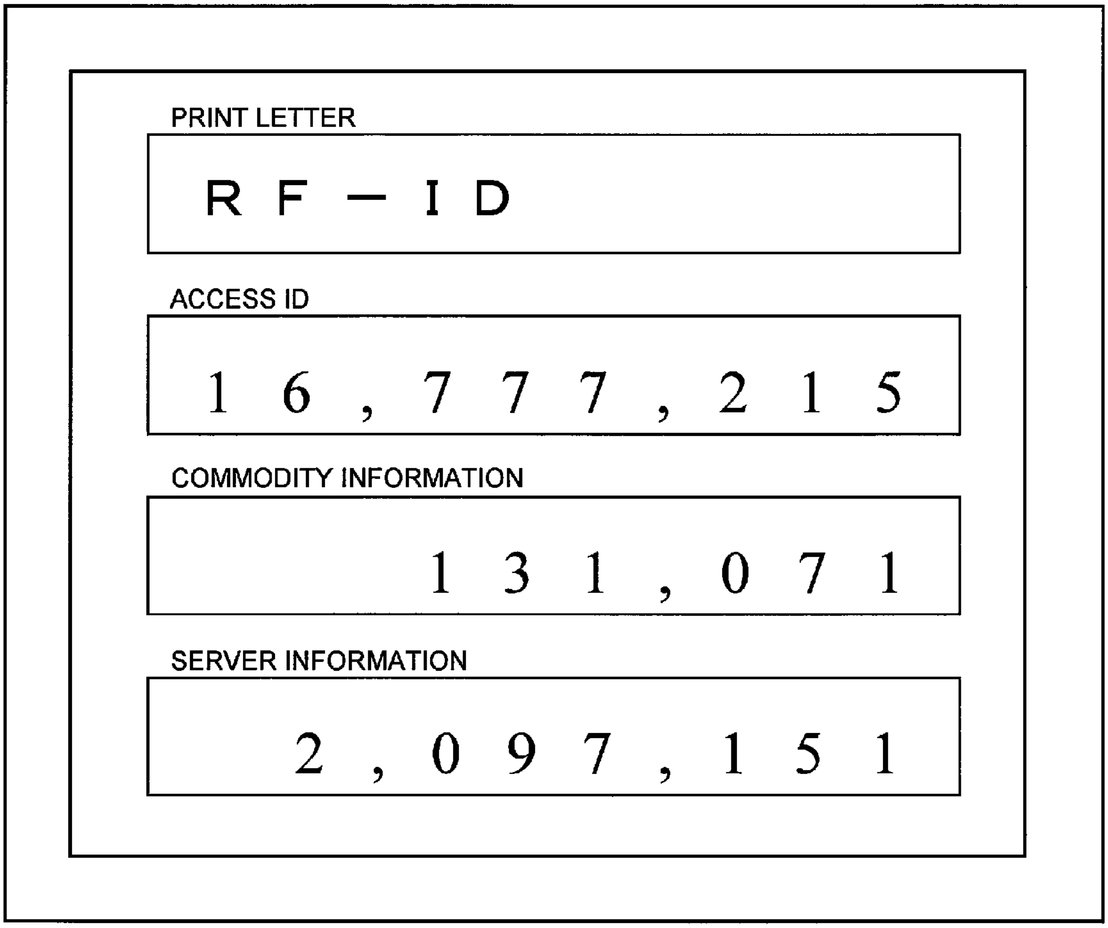

【FIG.10】
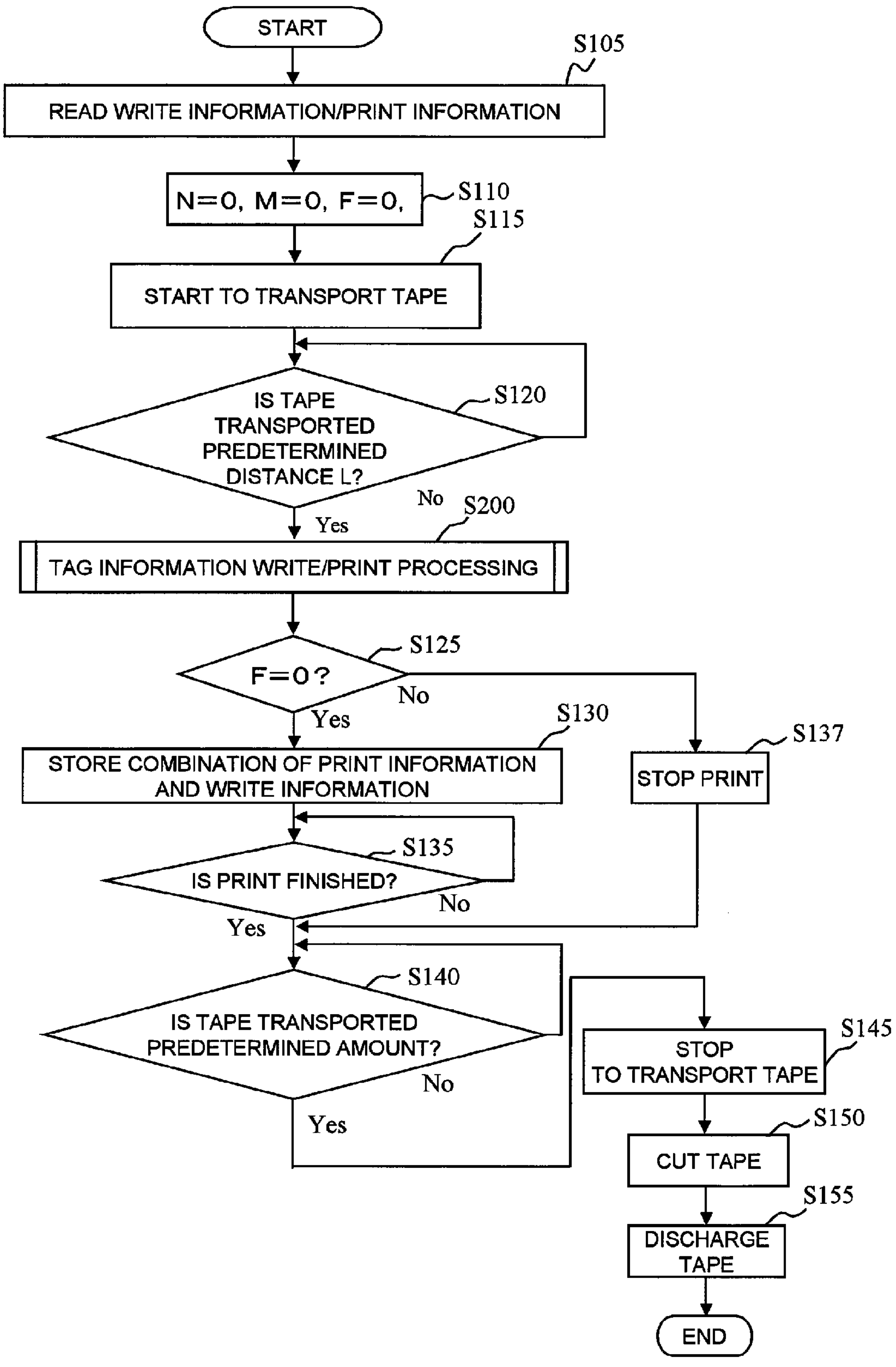

【FIG.11】
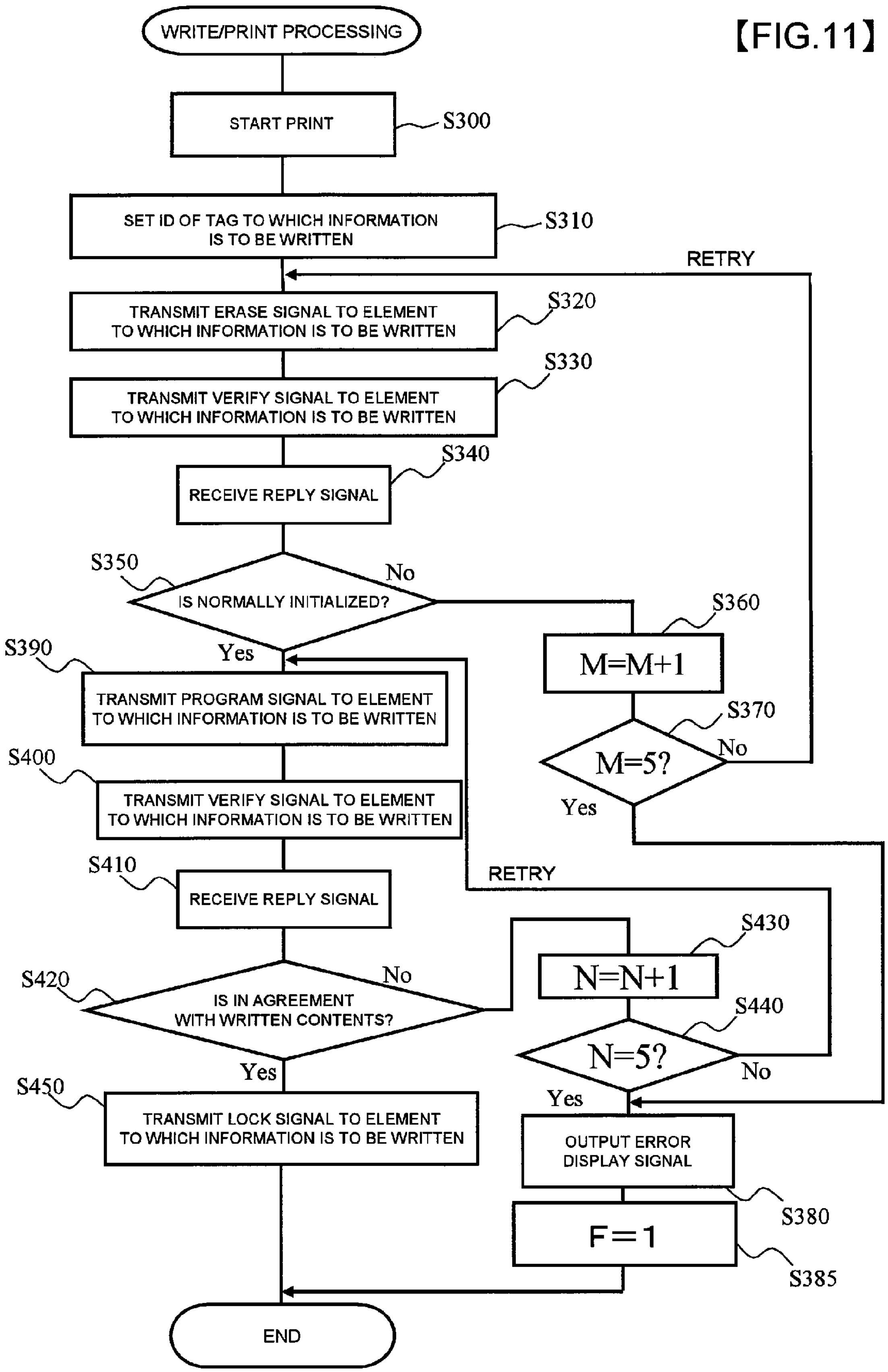

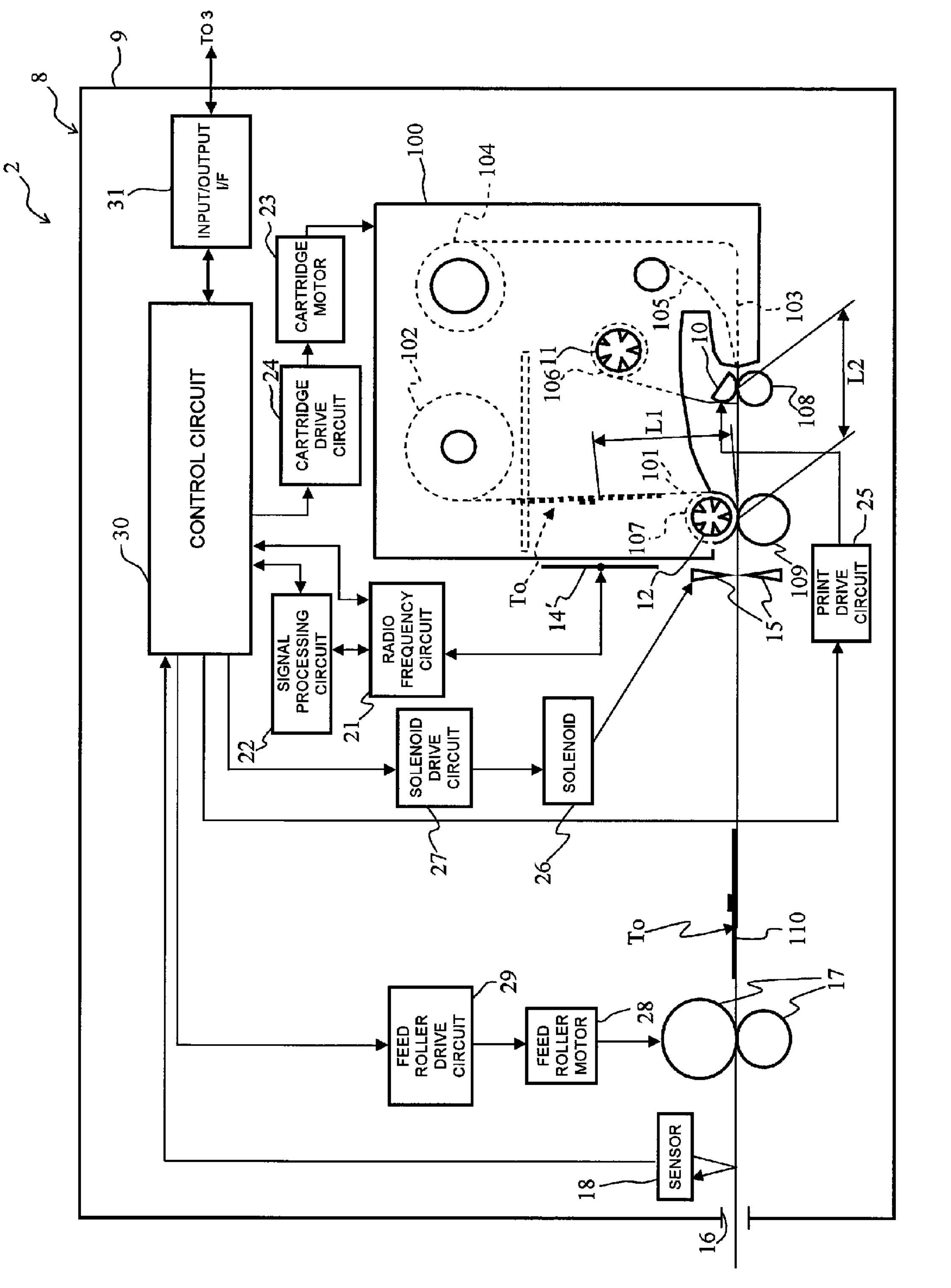
【FIG.12】

【FIG.13】
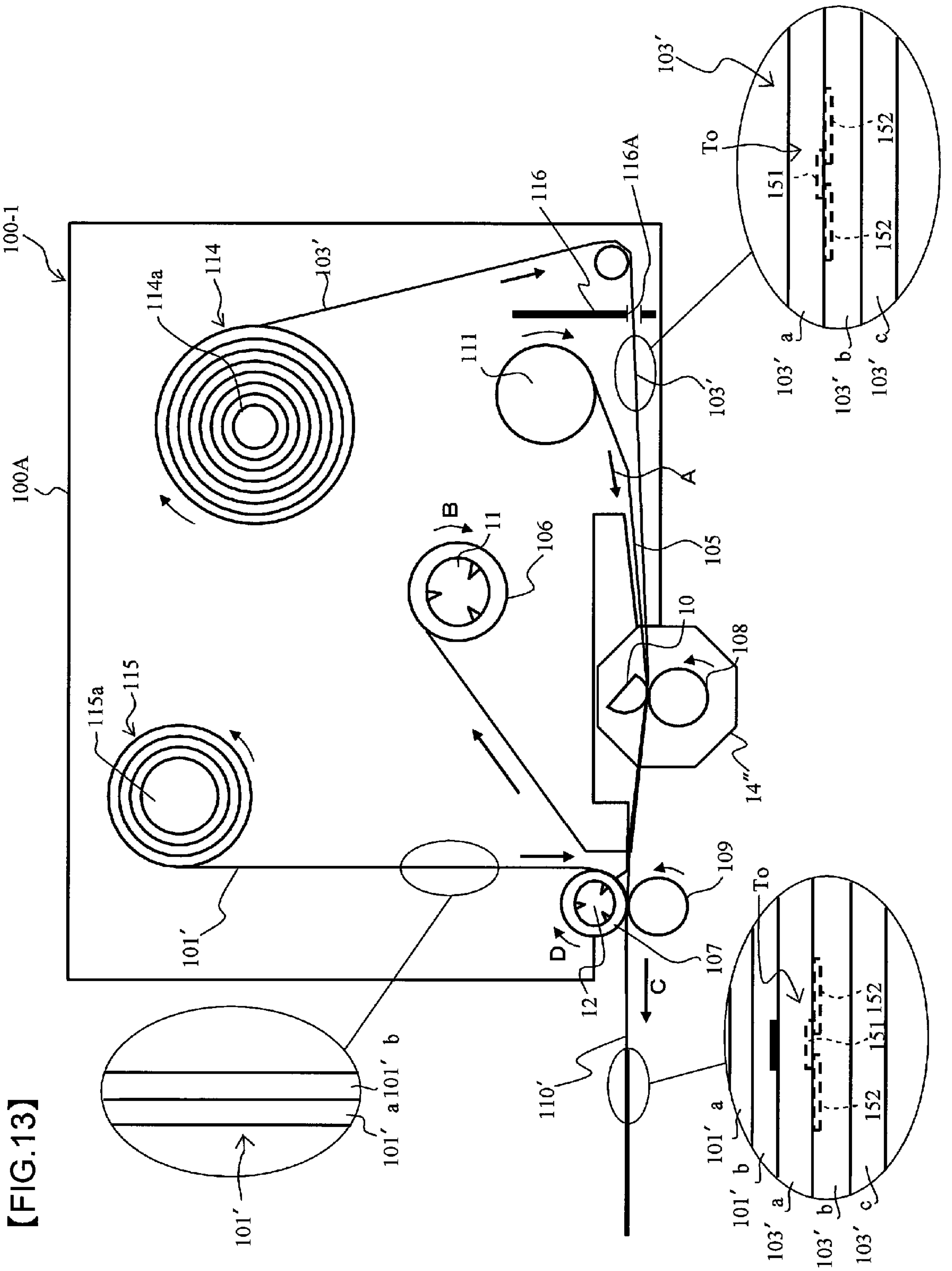

【FIG.14】
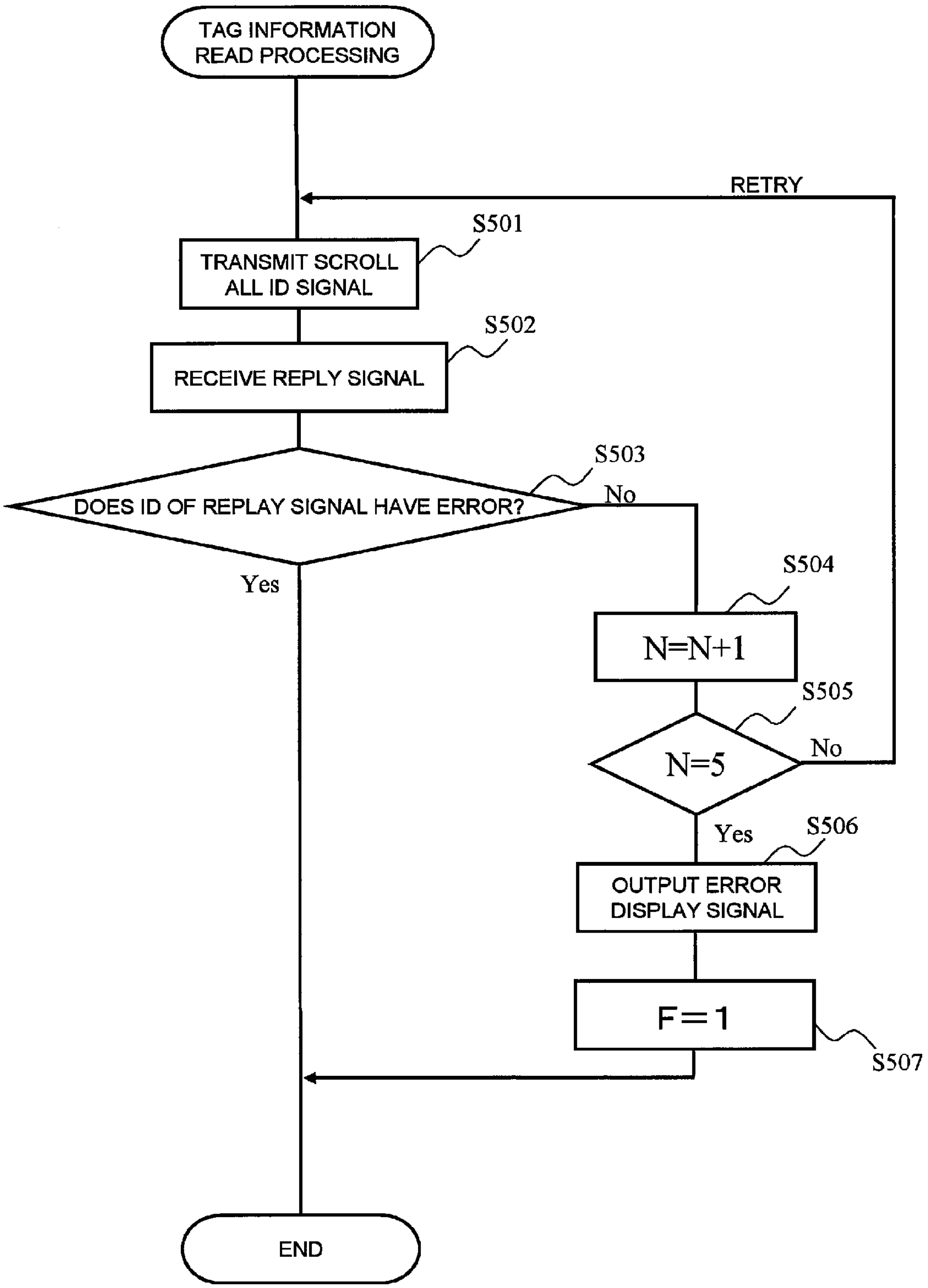

【FIG.15】
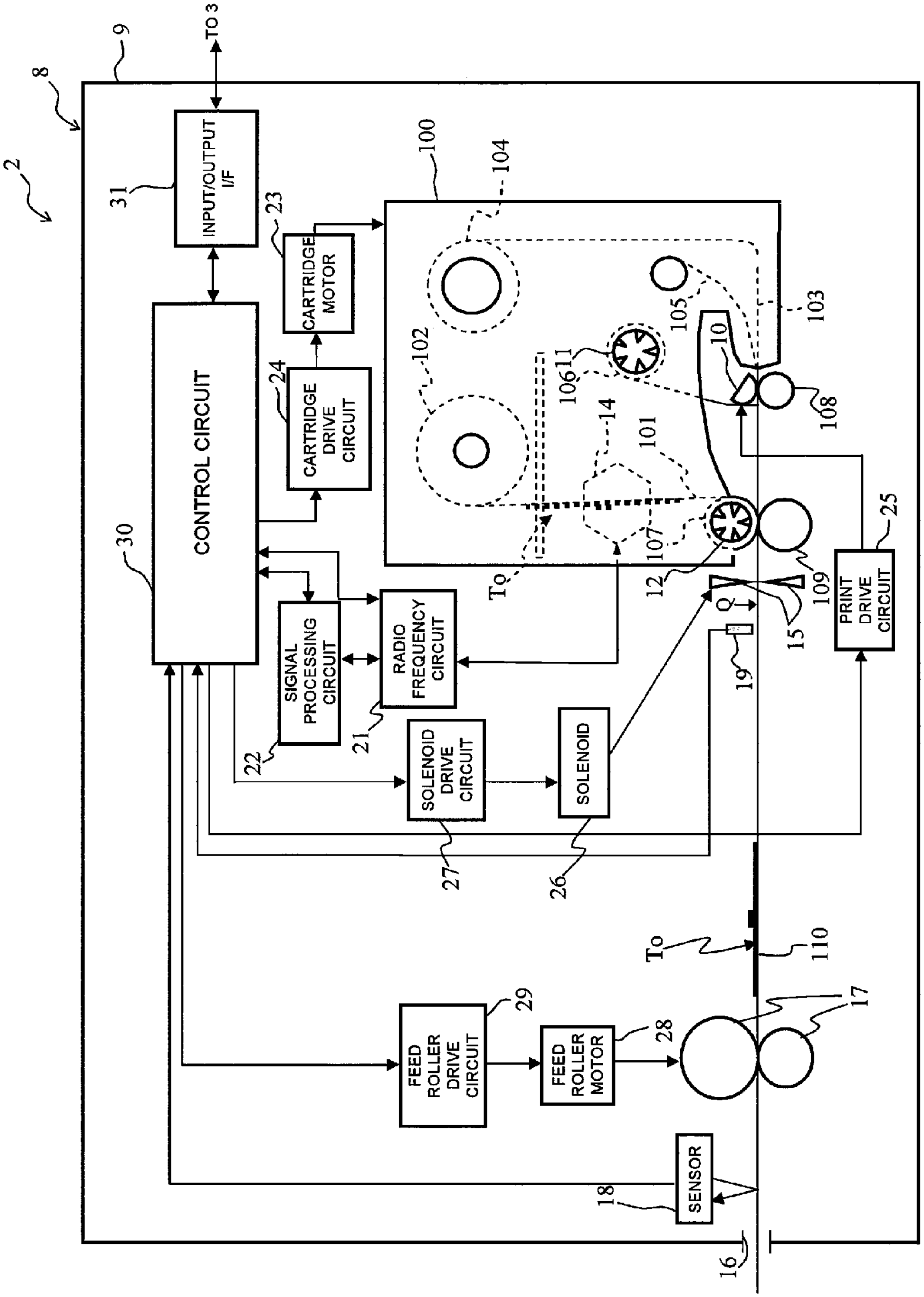

【FIG.16】
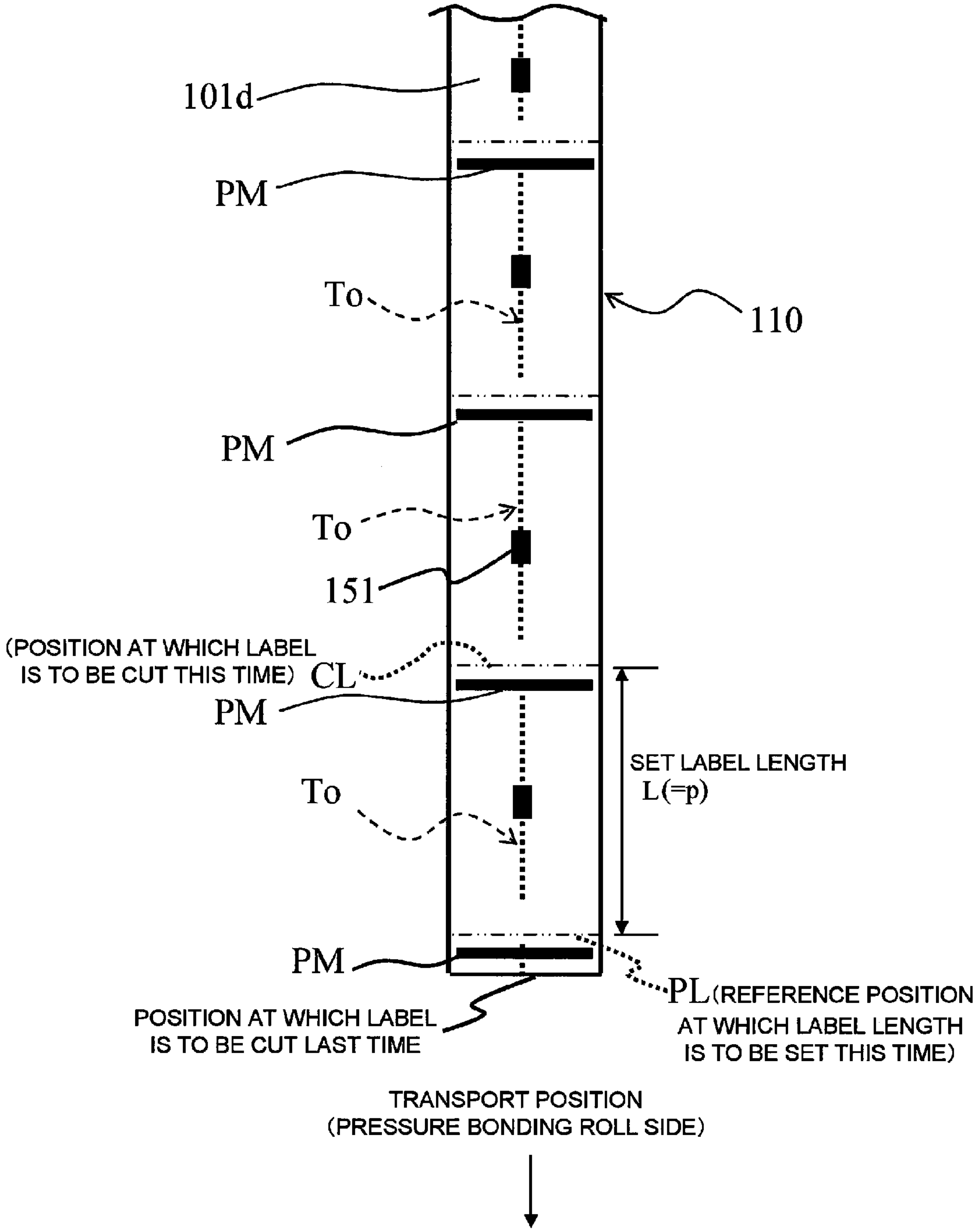

LABEL PRODUCING APPARATUS

CROSS-REFERENCE TO RELATED APPLICATION

This is a CIP application PCT/JP2005/014720, filed Aug. 11, 2005, which was not published under PCT article 21(2) in English and claims the benefits of Japanese Patent application No. 2004-235055 filed Aug. 12, 2004.

BACKGROUND OF THE INVENTION

1. Field of the Invention

The present invention relates to a label producing apparatus for continuously producing tape-like RFID tag labels capable of reading or writing RFID control information from the outside through wireless communication.

2. Description of the Related Art

There are known RFID (Radio Frequency Identification) systems for reading and write information between a compact RFID tag and a reader (reading device)/writer (write device) in a non-contact manner. For example, a RFID circuit element, which is disposed to, for example, a label-shaped RFID tag, has an IC circuit part for storing predetermined RFID control information and an antenna connected to the IC circuit part for transmitting and receiving information. Accordingly, even if the RFID tag is soiled or disposed at an invisible position, the reader/writer can access the RFID control information of the IC circuit part (can read/write the information), and thus it is expected to use the RFID systems in various fields such as commodity management, inspection process, and the like.

There is known a writer (printer) disclosed in, for example, Patent Publication 1 as a writer (printer) for write information to the RFID circuit element. In the conventional technology, a strip-shaped tag tape (base sheet), on which rectangular labels pieces (RFID labels) are bonded at predetermined intervals, is paid out from a tag tape roll (supply shaft), and passes through a transport path, predetermined RFID control information created on a device side is transmitted to antennas of RFID circuit elements contained in the respective label pieces and sequentially written to IC circuit parts (IC chips) connected to the antennas. Thereafter, the labels are transported downstream in a transporting direction, and print information corresponding to the RFID control information written above is printed to the surface of the RFID labels by a printing device (thermal head), thereby RFID tag labels are completed.

Patent Publication 1: JP,A,2003-159838 (Paragraphs 0011 to 0039, FIGS. 1 to 5)

SUMMARY OF THE INVENTION

However, the conventional technology has the following problems.

That is, when the RFID label is produced as described above, first, a device antenna, which is disposed upstream of a transport direction of a tag tape paid out from a roll, writes data to the tag tape, and the data is printed to the tag tape by a printing device after it is further transported downstream, and then the tag tape is discharged to the outside of the device through a discharge port. Accordingly, to write and print intrinsic RFID control information to respective RFID labels, actually, while a preceding RFID circuit element reaches a print head and is subjected to print, a succeeding RFID circuit element must wait for completion of the print processing of the preceding RFID circuit element on the proximal side of a device antenna disposed upstream. As a result, since it is not possible to dispose RFID circuit elements on the tag tape at close intervals, it is difficult to accommodate as many RFID circuit elements as possible one roll and to effectively and continuously carry out write processing.

Further, there is a case that a label is produced while reading RFID tag information from a read only RFID circuit element, in which predetermined RFID tag information is previously stored in an unrewritable fashion, as well as carrying out print in correspondence to the information, in addition to the case that a label is produced by write RFID tag information thereto as described above. When data is read from the RFID circuit element, it is also difficult to effectively and continuously process read processing as it is likewise the above case.

Accordingly, an object of the present invention is to provide a tag label producing apparatus capable of effectively and continuously carrying out read or write processing while disposing RFID circuit elements on a tape at close intervals.

BRIEF DESCRIPTION OF THE DRAWINGS

FIG. 1 is a system arrangement view showing a RFID tag producing system to which a label producing apparatus of an embodiment of the present invention is applied.

FIG. 2 is a conceptual arrangement view showing a detailed structure of the label producing apparatus shown in FIG. 1.

FIG. 3 is an explanatory view explaining a detailed structure of a cartridge shown in FIG. 2.

FIG. 4 is a side elevational view showing an example of a detailed structure of a guide roller shown in FIG. 3 when viewed from a direction P in FIG. 3.

FIG. 5 is a function block diagram showing a detailed function of a radio frequency circuit shown in FIG. 2.

FIG. 6 is a function block diagram showing a functional arrangement of a RFID circuit element.

FIG. 7A is an upper surface view showing an example of an outside appearance of a RFID tag label.

FIG. 7B is a lower surface view showing an example of an outside appearance of a RFID tag label.

FIG. 8 is a lateral sectional view taken along the line VIII-VIII' of FIG. 7.

FIG. 9 is a view showing an example of a screen displayed on a terminal or a general-purpose computer when RFID control information is written or read.

FIG. 10 is a flowchart showing a control procedure carried out by a control circuit shown in FIG. 2.

FIG. 11 is a flowchart showing a detailed procedure at step S200 of FIG. 10.

FIG. 12 is a conceptual arrangement view showing a detailed structure of a label producing apparatus according to a modification in which an antenna is disposed at a different position.

FIG. 13 is an explanatory view explaining a detailed structure of a cartridge disposed to a modification having RFID circuit elements to a print-receiving tape side.

FIG. 14 is a flowchart showing a procedure carried out by a control circuit to read RFID control information.

FIG. 15 is a conceptual arrangement view showing a detailed structure of a label producing apparatus according to a modification in which a reference position is determined by a mark formed on a separate sheet.

FIG. 16 is a conceptual back surface view showing a surface of a tag label tape when viewed from a direction Q in FIG. 15.

DETAILED DESCRIPTION OF THE PREFERRED EMBODIMENTS

An embodiment of the present invention will be described with reference to the drawings.

FIG. 1 is a system arrangement view showing a RFID tag producing system 1 to which a label producing apparatus 2 of the embodiment is applied.

In the RFID tag producing system 1 shown in FIG. 1, the label producing apparatus 2 according to the embodiment is connected to a route server 4, a terminal 5, a general purpose computer 6, and a plurality of information servers 7 through a wired or wireless communication line 3.

FIG. 2 is a conceptual arrangement view showing a detailed structure of the label producing apparatus 2.

In FIG. 2, a cartridge holder portion (not shown) as a recessed portion is formed to a main body 8 of the label producing apparatus 2, and a cartridge 100 is detachably mounted in the holder portion.

The main body 8 includes a print head (thermal head) 10 as a printing device for print a predetermined letter (carrying out a print) to a print-receiving tape 103 paid out from a second roll 104 (roll for the print-receiving tape); a ribbon take-up roller drive shaft 11 for driving an ink ribbon 105 that has finished the print to the print-receiving tape 103; a pressure bonding roller drive shaft 12 for transporting the print-receiving tape 103 and a base tape (tag tape) 101 paid out from a first roll (tag tape roll) 102 as a printed tag label tape 110 while bonding the print-receiving tape 103 to the base tape 101; an antenna (device antenna) 14 for transmitting and receiving a signal between it and RFID circuit elements To (that will be described later in detail) disposed to the printed tag label tape 110 using a radio frequency of a UHF band and the like; a cutter 15 for producing label-shaped RFID tag labels T (that will be described later in detail) by cutting off the printed tag label tape 110 to a predetermined length at predetermined timing; feed rollers 17 for transporting and delivering the RFID tag labels T to a delivery port (discharge port 16); and a cabinet (housing) 9 for constituting a shell for accommodating these components and having the cartridge holder portion 19, to which the cartridge 100 is detachably fitted, and the delivery port 16.

The antenna 14 is composed of a directional antenna (in the example, a so-called patch antenna) having directivity on one side (in the example, on a proximal side to a sheet surface of FIG. 2) and disposed in the vicinity of a transport path of the base tape 101 paid out from the first roll 102 (between the position at which the tape is paid out and the pressure bonding roller drive shaft 12) in a surface intersecting a tape surface of the transport path (in the example, a surface orthogonal to the tape surface; however, the surface is not limited to it and may intersect the tape surface at an intersecting angle of 45°, 60°, and the like other than 90°).

In contrast, the main body 8 further includes a radio frequency circuit 21 for accessing the RFID circuit element To (carrying out write or read operation) through the antenna 14; a signal processing circuit 22; for processing a signal read from the RFID circuit element To; a cartridge motor 23 for driving the ribbon take-up roller drive shaft 11 and the pressure bonding roller drive shaft 12 described above; a cartridge drive circuit 24 for controlling the drive of the cartridge motor 23; a print drive circuit 25 for controlling the power supplied to the print head 10; a solenoid 26 for driving the cutter 15 to cause it carry out cutting operation; a solenoid drive circuit 27 for controlling the solenoid 26; a feed roller motor 28 for driving the feed rollers 17; and a control circuit 30 for controlling the label producing apparatus 2 in its entirety through the radio frequency circuit 21, the signal processing circuit 22, the cartridge drive circuit 24, the print drive circuit 25, the solenoid drive circuit 27, a feed roller drive circuit 29, and the like.

Although not illustrated in detail, the control circuit 30 is a so-called micro computer that is composed of a CPU as a central processing unit, a ROM, a RAM, and the like, and carries out signal processing according to a program previously stored in the ROM while making use of a temporary storing function of the RAM. Further, the control circuit 30 is connected to, for example, a communication line though an input/output interface 31 so that it can transmit and receive information to and from the route server 4, the terminal 5, the general purpose computer 6, the information servers 7, and the like.

FIG. 3 is an explanatory view explaining a detailed structure of the cartridge 100.

In FIG. 3, the cartridge 100 includes a the housing 100A; the first roll 102 disposed in the housing 100A and having the base tape 101 wound therearound; the second roll 104 having the transparent print-receiving tape 103 approximately as wide as the base tape 101 wound therearound; a ribbon-supply-side roll 111 for rolling out the ink ribbon 105 (a thermal transfer ribbon, however, this is not necessary when the print-receiving tape is composed of a heat sensitive tape); a ribbon take-up roller 106 for taking up a ribbon 15 after it is subjected to print; and the shield member 113 for inserting a pressure bonding roller 107 (bonding device), a guide roller (guide device) 112, and the base tape 101 into the through hole 113A thereof to reduce leakage of a radio signal from the antenna 14 to the first roll 102 side.

The pressure bonding roller 107 presses the base tape 101 against the print-receiving tape 103 and bonds them to each other so as to arrange them as the printed tag label tape 110 and feeds the tape in the direction shown by an arrow A (also acts as a tape feed roller). At the time, the antenna 14 described above is disposed at a position of a distance L1 from the pressure bonding roller 107 approximately along the tape transport path of the base tape 101 on the upstream side (pressure bonding roller 107) in the transport direction of the base tape 101 from the pressure bonding roller 107. Further, the print head 10 is disposed at a position of a distance L2, which is approximately as long as the distance L1, from the pressure bonding roller 107 approximately along the tape transport path of the print-receiving tape 103 on the upstream side in the transport direction of the print-receiving tape 103.

The first roll 102 winds the base tape 101, on which a plurality of the RFID circuit elements To are sequentially formed in a lengthwise direction at predetermined intervals, around a reel member 102*a*.

In the example, the base tape 101 has a four-layer structure (refer to a partially enlarged view of FIG. 3) and is arranged by laminating an adhesive layer 101*a* composed of an appropriate adhesive material, a colored base film 101*b* composed of PET (polyethylene terephthalate) and the like, an adhesive layer 101*c* composed of an appropriate adhesive material, and a separation sheet (separation material) 101*d*, and the like in this order from a side thereof wound inward (on a right side in FIG. 3) to an opposite side (on a left side in FIG. 3).

An antenna (tag side antenna) 152 is disposed on the back side of the base film 101*b* (on the left side in FIG. 3) integrally therewith so that it transmits and receives information, an IC circuit part 151 for storing information is formed so as to be connected to the antenna 152, and the RFID circuit element To is composed of them.

The adhesive layer 101_a_ is formed on the front side of the base film 101_b_ (on the right side in FIG. 3) to bond the print-receiving tape 103 later, and further the separation sheet 101_d_ is bonded to the base film 101_b_ by the adhesive layer 101_c_ disposed to include the RFID circuit element To on the back side of the base film 101_b_ (on the left side of FIG. 3). Note that, when the RFID tag label T is finally finished to a label shape and bonded to a predetermined commodity and the like, it can be bonded thereto through the adhesive layer 101_c_ exposed by separating the separation sheet 101_d_.

The second roll 104 winds the print-receiving tape 103 around a reel member 104_a_. The ribbon 15 driven by the ribbon-supply-side roll 111 and the ribbon take-up roller 106, which are disposed on the back surface side of the print-receiving tape 103 paid out by the second roll 104 (that is, on a side where it is bonded to the base tape 101) is abutted against the back surface of the print-receiving tape 103 by being pressed against the print head 10.

The ribbon take-up roller 106 and the pressure bonding roller 107 are driven in rotation by transmitting the drive force of the cartridge motor 23 (refer to FIG. 2 described above), which is, for example, a pulse motor disposed to the outside of the cartridge 100 to the ribbon take-up roller drive shaft 11 and the pressure bonding roller drive shaft 12.

In the cartridge 100 arranged as described above, the base tape 101 paid out from the first roll 102 is supplied to the pressure bonding roller 107. In contrast, the ink ribbon 105, which is disposed to the back surface side of the print-receiving tape 103 (that is, the side thereof to be bonded to the base tape 101) and driven by the ribbon-supply-side roll 111 and the ribbon take-up roller 106 is pressed against the print head 10, thereby the ink ribbon 105 is abutted against the back surface of the print-receiving tape 103.

Then, when the cartridge 100 is mounted in the cartridge holder portion of the main body 8 and a roll holder (not shown) is moved from a separate position to an abutment position, the print-receiving tape 103 and the ink ribbon 105 are clamped between the print head 10 and a platen roller 108 as well as the base tape 101 and the print-receiving tape 103 are clamped between the pressure bonding roller 107 and a sub-roller 109 (which constitute a bonding device together). Then, the ribbon take-up roller 106 and the pressure bonding roller 107 are driven in rotation in synchronism, respectively by the drive force of the cartridge motor 23 in the directions shown by arrows B and D. At the time, the pressure bonding roller drive shaft 12, the sub-roller 109 and the platen roller 108 described above are coupled with each other by gears (not shown). Thus, the pressure bonding roller 107, the sub-roller 109, and the platen roller 108 are rotated by driving the drive shaft 12, thereby the base tape 101 is paid out from the first roll 102 and supplied to the pressure bonding roller 107 as described above. In contrast, the print-receiving tape 103 is paid out from the second roll 104 as well as a plurality of heating elements of the print head 10 are energized by the print-head drive circuit 25. As a result, a print R (refer to FIG. 8 to be described below), which corresponds to a RFID circuit element (To) on the base tape 101 as a target to be bonded is printed to the back surface of the print-receiving tape 103. Then, the base tape 101 is bonded to and integrated with the print-receiving tape 103 having been subjected to the print by the pressure bonding roller 107 and sub-roller 109. As a result, a printed tag label tape is formed of them and is transported to the outside of the cartridge 100. Note that the ink ribbon 105, which has been finished print to the print-receiving tape 103, is taken up to the ribbon take-up roller 106 by driving the ribbon take-up roller drive shaft 11.

FIG. 4 is a side elevational view of FIG. 3 viewed from the direction of P, P' in FIG. 3 and shows an example of a detailed structure of the guide roller 112.

In FIG. 4, the guide roller 112 includes an approximately cylindrical hollow roller body 112A, a through hole 112B passing through the roller body 112A in an axial direction, and an irregular portion 112C formed on the radially outer peripheral side of the roller body 112A.

Approximately-round-bar-shaped upper and lower guide roller support portions 100Aa, 100Ab, which are disposed to the housing 100A of the cartridge 100, are inserted into the through hole 112B. Not shown bearings are interposed between the through hole 112B and the guide roller support portions 100Aa, 100Ab, thereby the guide roller 112 is rotatably supported by the housing 100A.

With the above structure, even if a position to which the base tape 101 is paid out from the first roll 102 is changed as the base tape 101 is exhausted (refer to a two-dot-and-dash line in FIG. 3), the guide roller 112 guides the base tape 101 paid out from the first roll 102 so that the distance of the transport path of the base tape 101 to the antenna 14 is regulated within a predetermined range at all times.

Note that the irregular portion 112C is formed in, for example, a saw-teeth shape (however, the shape of its extreme end is not limited to a sharp shape as illustrated and may be an R-shape or an arc shape) to reduce the area thereof in contact with the base tape 101 as much as possible in the guide operation as described above to prevent the base tape 101 from being bonded by the adhesive material of the adhesive layer 101_a_. Further, an appropriate material, which is unlike to cause bonding due to the adhesive material is employed as a material constituting the roller body 112A.

FIG. 5 is a function block diagram showing a detailed function of the radio frequency circuit 21. In FIG. 5, the radio frequency circuit 21 is composed of a transmission portion 32 for transmitting a signal to the RFID circuit element To through the antenna 14, a receiving portion 33 for inputting a wave received by the antenna 14 and reflected from the RFID circuit element To, and a transmit-receive splitter 34.

The transmission portion 32 includes a crystal oscillator 35 for generating a carrier wave for accessing the RFID control information of the IC circuit part 151 of the RFID circuit element To (for carrying out write or read); a PLL (Phase Locked Loop) 36; a VCO (Voltage Controlled Oscillator) 37; a transmission multiplying circuit 38 for subjecting the generated carrier wave to modulation based on a signal supplied from the signal processing circuit 22 (in this example, for subjecting it to amplitude modulation based on a "TX_ASK" signal supplied from the signal processing circuit 22; however, in the amplitude modulation, an amplification factor variable amplifier and the like may be used in the amplitude modulation); and a variable transmission amplifier 39 for amplifying a modulated wave modulated by the transmission multiplying circuit 38 by determining an amplification factor by a "TX_PWR" signal from the control circuit 30. The generated carrier wave employs a frequency of a preferable UHF band an output from the transmission amplifier 39 is transmitted to the antenna 14 through the transmit-receive splitter 34 and supplied to the IC circuit part 151 of the RFID circuit element To.

The receiving portion 33 includes a first reception multiplying circuit 40 for multiplying the wave received by the antenna 14 and reflected from the RFID circuit element To; a first band-pass filter 41 for fetching only a signal of a necessary band from an output of the first reception multiplying circuit 40; a first receiving amplifier 43 for multiplying an output of the first band-pass filter 41 and supplying it to a first limiter 42; a second reception multiplying circuit 44 for multiplying the wave received by the antenna 14 and reflected from RFID circuit element To by the carrier wave whose phase is delayed 90° after it is generated; a second band-pass filter 45 for fetching only a signal of a necessary band from an output of the second reception multiplying circuit 44; and a second receiving amplifier 47 input with an output of the second band-pass filter 45 as well as multiplying the output and supplying it to a second limiter 46. A signal "RXS-I" output from the first limiter 42 and a signal "RXS-Q" output from the second limiter 46 are input to the signal processing circuit 22 and processed thereby.

Further, outputs from the first receiving amplifier 43 and the second receiving amplifier 47 are input also to an RSSI (Received Signal Strength Indicator) circuit 48, and signals "RSSI" showing the intensities of the signals are input to the signal processing circuit 22. With the above operation, in the label producing apparatus 2 of the embodiment, the wave reflected from the RFID circuit element To is modulated by I-Q orthogonal modulation.

FIG. 6 is a function block diagram showing a functional arrangement of the RFID circuit element To. In FIG. 6, the RFID circuit element To includes the antenna 152 for transmitting and receiving a signal to and from the antenna 14 on the label producing apparatus 2 side using the radio frequency of the UHF band the like in a non-contact mode and the IC circuit part 151 connected to the antenna 152.

The IC circuit part 151 includes a rectification part 153 for rectifying the carrier wave received by the antenna 152; a power source part 154 for accumulating the energy of the carrier wave rectified by the rectification part 153 and using it as a drive power source; a clock extraction part 156 for extracting a clock signal from the carrier wave received by the antenna 152 and supplying it to a control unit 155; a memory part 157 capable of storing a predetermined information signal; a modem part 158 connected to the antenna 152; and the control unit 155 for controlling actuation of the RFID circuit element To through the rectification part 153, the clock extraction part 156, the modem part 158, and the like.

The modem part 158 demodulates a communication signal supplied from the antenna 14 of the label producing apparatus 2 and received by the antenna 152 as well as modulates and reflects the carrier wave received by the antenna 152 based on a response signal from the control unit 155.

The control unit 155 carries out a basic control such as interpretation of the received signal demodulated by the modem part 158, creation of a return signal based on the information signal stored in the memory part 157 and return of the return signal by the modem part 158, and the like.

FIG. 7A and FIG. 7B are views showing an example of an outside appearance of a RFID tag label T formed by finishing to write the information to the RFID circuit element To and to cut off the printed tag label tape 110 as described above, wherein the FIG. 7A is an upper surface view, and the FIG. 7B is a lower surface view. Further, FIG. 8 is a lateral sectional view taken long the line VIII-VIII' of FIG. 7A.

In the FIG. 7A, FIG. 7B, and FIG. 8, the RFID tag label T has a five-layer structure in which the print-receiving tape 103 is added to the four-layer structure shown in FIG. 3, and five layers are composed of the print-receiving tape 103, the adhesive layer 101*a*, the base film 101*b*, the adhesive layer 101*c*, and the separation sheet 101*d* from the print-receiving tape 103 side (upper side in FIG. 8) to the opposite side thereof (lower side in FIG. 8). As described above, the RFID circuit element To including the antenna 152 disposed to the back side of the base film 101*b* is provided in the adhesive layer 101*c* as well as letters R (in the example, letters "RF-ID" showing a type of the RFID tag label T) is printed on the back surface of the print-receiving tape 103.

FIG. 9 is a view showing an example of a screen displayed on the terminal 5 or the general purpose computer 6 when the RFID control information of the IC circuit part 151 of the RFID circuit element To is accessed by the label producing apparatus 2 as described above (when information is written to or read from the RFID circuit element To).

In the example, the print letters R printed in correspondence to the RFID circuit element To, an access (write or read) ID that is an ID unique to the RFID circuit element To, an address of commodity information stored in the information servers 7, and addresses of the information corresponding to them in the route server 4, and the like can be displayed on the terminal 5 or the general purpose computer 6 in FIG. 9. When the terminal 5 or the general purpose computer 6 is manipulated, the label producing apparatus 2 is operated and the letters R are printed to the print-receiving tape 103 as well as the information such as the write ID, the commodity information, and the like are written to the IC circuit part 151 (or the RFID control information such as the commodity information and the like previously stored in the IC circuit part 151 is read). Note that the "read/write" of the RFID control information in this case is to be understood in such a wide range that it includes not only so-called read/write of data but also transmission of a signal for halting a response such as a signal based on "Kill" and "Sleep" commands.

In the above write (or read) operation, a correspondence relation between the ID of the created RFID tag label T and the information read from the IC circuit part 151 of the RFID tag label T (or the information written to the IC circuit part 151) is stored in the route server 4 described above and can be referred to when necessary.

As described above, a greatest feature of the label producing apparatus 2 of the embodiment resides in that the antenna 14 and the print head 10 are disposed on the upstream side in the tape transport direction of the pressure bonding roller 107 (in particular, the distance L1 from the antenna 14 to the pressure bonding roller 107 is set approximately as long as the distance L2 from the print head 10 to the pressure bonding roller 107) and that the RFID control information is read and written from the antenna 14 to the IC circuit part 151 of the RFID circuit element To approximately simultaneously with that the print head 10 prints the letters R to the print-receiving tape 103.

FIG. 10 is a flowchart showing a control procedure carried out by the control circuit 30 to produce the RFID tag label T described above. That is, in the flowchart, the base tape 101 is transported and the RFID control information is written while the print-receiving tape 103 is transported and a predetermined letter is printed thereto by the print head 10, the printed tag label tape 110 is produced by bonding the print-receiving tape 103 to the base tape 101, and then RFID tag labels T are produced by cutting the printed tag label tape 110 so that each label T includes a RFID circuit element To.

In FIG. 10, first, at step S105, the flow is started by carrying out a write manipulation of the label producing apparatus 2. Then, the RFID control information, which is input through the terminal 5 or the general purpose computer 6 and to be written to the RFID circuit element To, and print information, which is to be printed to the RFID tag label T by the print head 10 in correspondence to the RFID control information, are read through the communication line 3 and the input/output interface 31.

Thereafter, at step S110, variables M and N for counting the number of times of retry carried out when communication failure is doubted and a flag F showing whether or not communication is succeeded are initialized.

At step S115, a control signal is output to the cartridge drive circuit 24, and the ribbon take-up roller 106 and the pressure bonding roller 107 are driven in rotation by the drive force of the cartridge motor 23. With this operation, the base tape 101 is paid out from the first roll 102 and supplied to the pressure bonding roller 107, and the print-receiving tape 103 is paid out from the second roll 104. Further, a control signal is output to the feed roller motor 28 through the feed roller drive circuit 29, thereby the feed rollers 17 is driven in rotation. As a result, the base tape 101 is bonded to the print-receiving tape 103 by the pressure bonding roller 107 (and by the sub roller 109) and integrated with each other as described above and then transported to the outside of the cartridge 100.

Thereafter, the process goes to step S120 at which it is determined whether or not the base tape 101 and the print-receiving tape 103 are transported a predetermined value L (for example, a transport distance in which the RFID control information has been written and printed to a preceding RFID circuit element To and the print region of the print-receiving tape 103 corresponding to it and a next RFID circuit element To has reached a position approximately confronting the antenna 14). It is sufficient to determine the transport distance at the time by detecting an appropriate identification mark formed to the base tape 101 by a known tape sensor provided separately. When the determination is Yes, the process goes to step S200.

At step S200, after tag information write/print processing is carried out and a memory to which tag information is written is initialized (delete processing), a transmission signal including the RFID control information is transmitted to the RFID circuit element To on the base tape 101 and written thereto as well as the letters R are printed to a corresponding region of the print-receiving tape 103 by the print head 10 (as to the detail of the step, refer to FIG. 11 to be described later). When the processing at step S200 is finished, the process goes to next step S125.

At step S125, whether or not flag F=0 is determined. When the write processing is normally finished, since F=0 is kept as it is (refer to step S385 of a flow of FIG. 11 to be described later), the determination is Yes, and the process goes to step S130.

At step S130, a combination of the information written to the RFID circuit element To at step S200 and the print information already printed by the print head 10 in correspondence to the above information is output through the terminal 5 or the general purpose computer 6 through the input/output interface 31 and the communication line 3 and stored to the information servers 7 and the route server 4. Note that the stored data is stored and kept to, for example, a database so that it can be referred to by the terminal 5 or the general purpose computer 6 when necessary.

Thereafter, at step S135, it is determined whether or not the print to the region corresponding to the RFID circuit element To be processed in the print-receiving tape 103 is entirely finished, and then the process goes to step S140.

When the write processing is not normally finished due to any reason at step S125 described above, since F=1 (refer to step S385 of the flow of FIG. 11 to be described later), the determination at step 125 is No, and the process goes to step S137. At step S137, the print operation is stopped by deenergizing the print head 10 by outputting a control signal to the print drive circuit 25. It is clearly shown that the RFID circuit element To is a defective product by interrupting the print operation. Note that a special mode of letters may be printed as a warning or a reminder of the defective product in place of interrupting the print operation.

When the processing at step S137 is finished, the process goes to step S140.

At step S140, it is determined whether or not the printed tag label tape 110 is further transported a predetermined amount (for example, a transport distance in which all of the RFID circuit element To be processed and the print region of the print-receiving tape 103 corresponding to the RFID circuit element To move beyond the cutter 15 by a predetermined length (an amount of margin)). It is sufficient to determine the transport distance at the time by, for example, detecting a marking by a tape sensor likewise step S120 described above. When the determination is Yes, the process goes to step S145.

At step S145, the drive of the cartridge motor 23 and the feed roller motor 28 is stopped by outputting a control signal to the cartridge drive circuit 24 and the feed roller drive circuit 29, thereby the rotation of the ribbon take-up roller 106, the pressure bonding roller 107, and the feed rollers 17 is stopped. With this operation, the base tape 101 being paid out from the first roll 102, the print-receiving tape 103 being paid out from the second roll 104, and the printed tag label tape 110 being transported by the feed rollers 17 are stopped.

Thereafter, at step S150, the solenoid 26 is driven by outputting a control signal to the solenoid drive circuit 27, and the printed tag label tape 110 is cut off by the cutter 15. As described above, at the time, since the entire printed tag label tape 110, to which, for example, the RFID circuit element To be processed and the print region of the print-receiving tape 103 corresponding to it is bonded, is transported sufficiently beyond the cutter 15, when the printed tag label tape 110 is cut off by the cutter 15, label-shaped RFID tag labels T, in each of which the RFID control information is written to the RFID circuit element To as well as a predetermined print corresponding to it is made, are produced.

Thereafter, the process goes to step S155, at which the feed roller motor 28 is driven again by outputting a control signal to the feed roller drive circuit 29, thereby the feed rollers 17 are rotated. With this operation, the RFID tag labels T formed in the label shape at step S150 are transported again to the delivery port 16 by the feed rollers 17 and discharged to the outside of the device 2 from the delivery port 16.

FIG. 11 is a flowchart showing a detailed procedure at step S200 described above.

In FIG. 11, first, at step S300, the print head 10 is energized by outputting the control signal to the print drive circuit 25, and the letters R such as the characters, signs, bar codes, and the like, which are read at step S105 of FIG. 10 described above, are printed to a region corresponding to the RFID circuit element To as an object to be processed of the print-receiving tape 103 (region bonded to the back surface of the RFID circuit element To by the pressure bonding roller 107).

Then, at step S310, an identification number ID, which is to be allocated to the RFID circuit element To which data is written, is set by an appropriate known method.

Thereafter, at step S320, an “Erase” command is output to the signal processing circuit 22 to initialize the information stored in the memory part 157 of the RFID circuit element To. An “Erase” signal as access information is created in the signal processing circuit 22 based on the “Erase” command and transmitted to the RFID circuit element To, to which information is written, through the radio frequency circuit 21, thereby the memory part 157 of the RFID circuit element To is initialized.

Next, at step S330, a “Verify” command is output to the signal processing circuit 22 to confirm the contents of the memory part 157. A “Verify” signal as access information is created in the signal processing circuit 22 based on the "Verify" command and transmitted to the RFID circuit element To, to which information is written, through the radio frequency circuit 21 so that a replay is prompted. Thereafter, at step S340, a reply signal transmitted from the RFID circuit element To, to which information is written, is received through the antenna 14 and fetched through the radio frequency circuit 21 and the signal processing circuit 22.

Next, at step S350, the information in the memory part 157 of the RFID circuit element To is confirmed based on the reply signal, and whether the memory part 157 is normally initialized or not is determined.

When the determination is No, the process goes to step S360 at which M is incremented by 1, and further whether M=1 or not is determined at step S370. When M=4, since the determination is No, the process returns to step S320 at which the same procedures are repeated. When M=5, the process goes to step S380 at which an error display signal is output to the terminal 5 or the general purpose computer 6 through the input/output interface 31 and the communication line 3, and a corresponding write error display is carried out, thereby the flow is finished. Even if the initialization fails, it is retried up to five times. Note that, when the base tape 101 wound round the first roll 102 is entirely exhausted, since the reply signal is not received at S340 because the RFID circuit element To does not exist, the determination at step S350 is No, and thus the above display is also carried out.

When the determination at step S350 is Yes, the process goes to step S290 at which a "Program" command is output to the signal processing circuit 22 to write desired data to the memory part 157. A "Program" signal as access information including ID information, which is desired to be written in the signal processing circuit 22, is creased based on the "Program" command and transmitted to the RFID circuit element To, to which information is to be written, through the radio frequency circuit 21, and the information is written to the memory part 157 of the RFID circuit element To.

Thereafter, at step S400, a "Verify" command is output to the signal processing circuit 22. A "Verify" signal as access information is created in the signal processing circuit 22 based on the "Verify" command and transmitted to the RFID circuit element To, to which information is to be written, through the radio frequency circuit 21 so that a replay is prompted. Thereafter, at step S410, a reply signal transmitted from the RFID circuit element To, to which information is to be written, is received through the antenna 14 and fetched through the radio frequency circuit 21 and the signal processing circuit 22.

Next, at step S420, the information stored in the memory part 157 of the RFID circuit element To is confirmed based on the reply signal, and it is determined whether or not the predetermined information transmitted as described above is normally stored to the memory part 157.

When the determination is No, the process goes to step S430 at which N is incremented by 1, and further whether N=5 or not is determined at step S440. When N=4, since the determination is No, the process returns to step S390 at which the same procedures are repeated. When N=5, the process goes to step S380 described above and causes the terminal 5 or the general purpose computer 6 to carry out a corresponding display a write error and sets the flag described above to F=1 at step S385, thereby the flow is finished. Even if it is failed to write the information, it can be retried up to five times as described above.

When the determination at step S420 is Yes, the process goes to step S450 at which a "Lock" command is output to the signal processing circuit 22. A "Lock" signal is created in the signal processing circuit 22 based on the "Lock" command and transmitted to the RFID circuit element To, to which information is to be written through the radio frequency circuit 21, thereby it is prohibited to write new information to the RFID circuit element To. With this operation, the RFID control information has been written to the RFID circuit element To, to which information is to be written, and the RFID circuit element To is discharged as described above, thereby the flow is finished.

With the above routine, it is possible to write the corresponding RFID control information to the RFID circuit element To, to which data is to be written, on the base tape 101 in the cartridge 100 as well as to write the letters R corresponding to the RFID control information to a corresponding region on the print-receiving tape 103.

In the above arrangement, the transmission portion 32 of the radio frequency circuit 21 and the signal processing circuit 22 constitute a RFID control information creating device for creating the RFID control information to be written to the IC circuit part of the RFID circuit element disposed to any one of the tag tapes of the respective aspects of the present invention.

In the label producing apparatus 2 of the embodiment arranged as described above, the print-receiving tape 103, which is paid out from the second roll 104, and the base tape 101, which is paid out from the first roll 102, are bonded to each other by the pressure bonding roller 107 and made to the printed tag label tape 110, thereby the RFID tag labels T are created using the tag label tape 110.

At the time, the antenna 14 is disposed upstream of the pressure bonding roller 107 in the transport direction of the base tape 101. The RFID control information, which is created by the signal processing circuit 22 and the radio frequency circuit is transmitted to the antennas 152 of the RFID circuit elements (To) on the base tape 101, which is paid out from the second roll 104 and does not yet reach the pressure bonding roller 107, through the antenna 14 by wireless communication and written to the IC circuit parts 151. Further, at the time, the print head 10 is also disposed upstream of the pressure bonding roller 107 in the direction in which the print-receiving tape 103 is transported, and predetermined print is carried out to the print-receiving tape 103—paid out from the print-receiving tape roll 104 and does not yet reach the bonding device.

As described above, any of write and print of the RFID control information is carried out upstream of the location at which the tapes are bonded to each other by the pressure bonding roller 107 in the transport direction thereof. Accordingly, as shown in FIG. 3, the location at which the information is written and the location at which the information printed can be set to approximately the same position or positions near to each other when viewed from a position at which the respective tapes 101, 103 are transported. That is, since no tape transport operation is additionally carried out between write operation and print operation (refer to FIG. 10), the RFID circuit elements (To) can be disposed at close intervals on the base tape 101 different from a conventional art in which after the information is written to the tape upstream of the transport direction, the information must be printed to the tape by further transporting it downstream. Accordingly, it is possible to accommodate as many RFID circuit elements To as possible to the single first roll 102 and to effectively and continuously carry out the write processing.

In particular, in the embodiment, since the distance L1 from the pressure bonding roller 107 to the antenna 14 and the distance L2 from the pressure bonding roller 107 to the print head 10 L2 are approximately the same (L2 may be somewhat shorter than L1), the location at which the information is written and the location at which the information is printed can be set to approximately the same position when viewed from the positions in the directions in which the respective tapes 101, 103 are transported. As a result, since write and print are carried out approximately at the same time, the RFID circuit elements (To) can be more securely disposed on the base tape 101 at close intervals.

Further, there is also an advantage in that the label producing apparatus can be reduced in size in its entirety as compared with a case in which write is carried out by separately providing the antenna 14 externally of the cartridge 100.

Further, even if a position to which the base tape 101 is paid out from the first roll 102 changes, since the positional relation between the transport path of the base tape 101 and the antenna 14 is kept unchanged at all times by the provision of the guide roller 112, a stable and reliable RFID control information write performance can be secured.

Further, since the patch antenna having the directional property is used as the antenna 14, a radio wave can be prevented from being wastefully transmitted in a direction in which it is not necessary to transmit the radio wave. Further, since the antenna 14 is formed in a flat shape, the label producing apparatus 2 can be arranged compact.

It should be noted that the present invention is by no means limited to the above embodiment and can be variously modified within a range that does not depart from the gist and the technical idea of the embodiment. These modifications will be sequentially described below.

(1) Variation of Position at which the Antenna is Disposed:

FIG. 12 is a conceptual constitutional view showing a detailed structure of the label producing apparatus 2 of a modification in which the antenna is disposed to a different position and corresponds to FIG. 2 of the above embodiment. In FIG. 12, portions similar to those in FIG. 2 are denoted by the same reference numerals and the description thereof is appropriately omitted.

In FIG. 12, the modification is arranged such that an antenna 14' is composed of a directional antenna (patch antenna) having a directional property on one side (in the example, to the right side of FIG. 12) as well as disposed in the vicinity of the tape surface in a plane parallel to the tape surface of the transport path of the base tape 101 from the first roll 102 to the pressure bonding roller 107.

The locations, at which print operation and RFID control information write operation are carried out, are set to approximately the same position in the tape transport direction, and write and print are carried out approximately at the same time. As a result, the same advantage as the above embodiment can be obtained also in this modification in that the RFID circuit elements (To) can be disposed on the base tape 101 at close intervals.

(2) Case in which RFID Circuit Elements are Disposed to Print-receiving Tape:

FIG. 13 is an explanatory view explaining a detailed structure of a cartridge 100-1 disposed to the modification and corresponds to FIG. 3 of the above embodiment described above. Portions similar to those in FIG. 3 are denoted by the same reference numerals and the description thereof is appropriately omitted.

In FIG. 13, the cartridge 100-1 includes a third roll (print-receiving tape roll) 114 having a to-be-printed tag tape 103' wound therearound, a fourth roll 115 having a laminate tape 101 which is approximately as wide as the to-be-printed tag tape 103' and wound therearound, and a shield member 116 for reducing leakage of a radio signal from an antenna 14" to the third roll 114 by inserting the to-be-printed tag tape into an insertion hole 116A, and these components are disposed in a cabinet 100-1A.

The pressure bonding roller 107 presses and bonds the laminate tape 101' to the to-be-printed tag tape and feeds a printed tag label tape 110' formed of these tapes in the direction shown by an arrow A (also acts as a tape feed roller).

The antenna 14" is composed of a directional antenna (patch antenna) having directivity on one side (in the example, on a proximal side of a sheet surface of FIG. 13) as well as disposed so as to locate near to a tape surface of the transport path of the to-be-printed tag tape 103' from the third roll 114 to the pressure bonding roller 107 in a surface intersecting the tape surface (in the example, an orthogonal surface). Further, the antenna 14" and the print head 10 are disposed upstream of the pressure bonding roller 107 in the transport direction of the to-be-printed tag tap 103', respectively, and the distances of them along the tape transport direction from the pressure bonding roller 107 are set to approximately the same distance.

The third roll 114 has the strip-shaped to-be-printed tag tape 103' wound around a reel member 114*a*, and the to-be-printed tag tape has the plurality of the RFID circuit elements (To) sequentially formed thereon in a lengthwise direction. The to-be-printed tag tape 103' is composed of a three-layered structure in the example (refer to a partially enlarged view on the lower right side of FIG. 13) formed by laminating a cover film 103'*a* composed of PET (polyethylene terephthalate) and the like, an adhesive layer 103'*b* composed of an appropriate adhesive material, and a separation sheet 103'*c* in this order from a side wound inward to a side opposite to it.

The IC circuit parts 151 for storing information are disposed on the back surface of the cover film 103'*a* integrally therewith, and the antennas 152 are formed on the front surface of the back side of the cover film 103'*a*. The separation sheet 103'*c* is bonded to back surface of the cover film 103'*a* by the adhesive layer 103'*b*.

The fourth roll 115 has the strip-shaped laminate tape 101' wound around a reel member 115*a*. In the example, the laminate tape 101' is composed of a two-layered structure (refer to a partially enlarged view on the upper left side of FIG. 13) formed by laminating a laminate cover film 101'*a* composed of PET (polyethylene terephthalate) and the like and an adhesive layer 101'*b* composed of an appropriate adhesive material in this order from a side wound outward to a side opposite to it.

In the above arrangement, the laminate tape 101' paid out from the fourth roll 115 is supplied to the pressure bonding roller 107. In contrast, the ink ribbon 105 disposed on the back surface side (that is, the side to be bonded to the laminate tape 101') of the to-be-printed tag tape 103' paid out from the third roll 114 is pressed against the print head 10 and abutted against the back surface of the to-be-printed tag tape 103'.

Then, when the cartridge 100-1 is mounted in the cartridge holder portion of the main body 8 and the roll holder (not shown) is moved from the separate position to the abutment position, the to-be-printed tag tape 103' and the ink ribbon 105 are clamped between the print head 10 and the platen roller 108 as well as the laminate tape 101' and the to-be-printed tag tape 103' are champed between the pressure bonding roller 107 and the sub-roller 109. Then, likewise the above embodiment, the pressure bonding roller 107, the sub-roller 109, and the platen roller 108 are rotated by driving the pressure bonding roller drive shaft 12 by the drive force of the cartridge motor 23, thereby the laminate tape 101' is paid out from the fourth roll 115 and supplied to the pressure bonding roller 107. In contrast, the to-be-printed tag tape 103' is paid out from the third roll 114, and the print R corresponding to a RFID circuit element (To) located on the back side thereof is printed to the front side of the cover film 103'*a*. Further, approximately at the same time, the RFID control information is written to the RFID circuit element (To) likewise the explanation made using FIGS. 10 and 11 in the above embodiment. Then, the laminate tape 101' is bonded to and integrated with the to-be-printed tag tape 103', which has been subjected to the write and the print, by the pressure bonding roller 107 and the sub-roller 109, and a printed tag label tape 110' is formed of them and transported to the outside of the cartridge 100-1.

After the tag label tape 110' is transported to the outside of the cartridge 100, it is subjected to transport by the feed roller 17, cut by the cutter 15, and like. Since these processes are the same as the above embodiment, explanation thereof is omitted.

Note that a heat sensitive tape may be used as the to-be-printed tag tape 103' (a heat sensitive layer is formed in place of the cover film 103'*a*). In this case, the ink ribbon 105, the rollers 106, 111 for driving it, and the like are not necessary. Further, the above embodiment shows the example in which the fourth roll 115 and the laminate tape 101' are provided, the laminate cover film is bonded to the to-be-printed tag tape 103' to protect the printed surface thereof. However, when it is not necessary to protect the printed surface, it is not necessary to provide the laminate tape 101, the fourth roll 115, and the like.

Further, to take all possible measures to ensure write carried out by the embodiment, a guide roller similar to the guide roller 112 of the above embodiment (or a guide roller having a more simple shape and structure because there is no possibility of adhesion) may be provided.

Since the locations, at which the print operation and the RFID control information write operation are carried out, are set to approximately the same position in the transport direction of the print-receiving tape 103', write and print can be carried out approximately at the same time also in the modification. As a result, the same advantage as the above embodiment can be obtained in that the RFID circuit elements (To) can be disposed on the to-be-printed tag tape 103' at close intervals also in this modification.

(3) When Read-only Tag is Produced:

Although the case in which the RFID control information is transmitted to the RFID circuit elements (To) and written to the IC circuit parts is explained above as an example, the present invention is not limited thereto. That is, there is a case in which a label is produced while reading the RFID control information from a read only RFID circuit element, in which predetermined RFID control information (tag identification information and the like) is previously stored in an unrewritable fashion, as well as carrying out print in correspondence to the information, and the present invention can be also applied to the case.

In this case, it is sufficient to read only print information at step S105 in FIG. 10, and to carry out RFID control information read processing at step S210 (as to the detail of the case, refer to FIG. 14 to be described later). Thereafter, at step S130, a combination of the print information and the read RFID control information is stored.

FIG. 14 is a flowchart showing a detailed procedure of the RFID tag read processing.

In FIG. 14, when a RFID circuit element (To) as a target from which information is to be read is transported to the vicinity of the antenna 14, at step S501, a "Scroll All ID" command is output the signal processing circuit 22 to read the information stored in the RFID circuit element (To). A "Scroll All ID" signal as the RFID control information is created in the signal processing circuit 22 based on the "Scroll All ID" command and transmitted to the RFID circuit element To as the target to be read through the radio frequency circuit 21, thereby a reply is promoted.

Next, at step S502, a reply signal (RFID control information including tag ID information and the like) transmitted from the RFID circuit element To as the target to be read in correspondence to the "Scroll All ID" signal is received through the antenna 14 and captured through the radio frequency circuit 21 and the signal processing circuit 22.

Next, at step S503, it is determined whether or not the reply signal received at step S502 has an error by a known detection code (CRC code; Cyclic Redundancy Check, and the like).

When the determination is No, the process goes to step S504 at which N is incremented by 1, and further whether N=5 or not is determined at step S505. When N?4, since the determination is No, the process returns to step S501 at which the same procedures are repeated. When N=5, the process goes to step S506 at which an error display signal is output to the terminal 5 or the general purpose computer 6 through the input/output interface 31 and the communication line 3 and a corresponding read error display is carried out, and then the flag is set to F=1, thereby the routine is finished. Even if it is failed to read the information, it can be retried up to five times as described above so that reliability for read can be sufficiently secured.

When the determination at step S503 is Yes, the RFID control information has been read from the RFID circuit element To, from which information is to be read, thereby the routine is finished.

With the above routine, the RFID control information (tag identification information and the like) of the IC circuit part of the RFID circuit element To, from which information is to be read, can be accessed and read.

In the modification, the location at which the RFID control information is read and the location at which it is printed can be set approximately the same position or positions near to each other when viewed from the transport directions of the respective tapes 101, 103 likewise the above embodiment. As a result, RFID circuit elements (To) can be disposed on the base tape 101 at close intervals. Accordingly, it is possible to accommodate as many RFID circuit elements To as possible to the single first roll 102 and to effectively and continuously carry out the read processing. In particular, since L1=L2, the RFID circuit elements (To) can be more securely disposed on the base tape 101 at close intervals.

(4) When Reference Position is Determined by Mark Disposed to Separation Sheet:

FIG. 15 is a conceptual arrangement diagram showing a detailed structure of a label producing apparatus 2 according to the modification and is a view approximately corresponding to FIG. 2 of the above embodiment. Further, FIG. 16 is a conceptual back surface view showing a tape surface of the tag label tape 110 when viewed from the direction Q in FIG. 15.

In FIGS. 15 and 16, in the modification, a positioning mark PM (=identifier which may also act as the identification mark described above or may be a different mark) is formed at a predetermined position corresponding to the position at which the RFID circuit element (To) is disposed in the separation sheet 101*d* of the base tape 101, and a sensor 19 (identifier detecting device) is disposed to detect the positioning mark PM. When one RFID label T is produced and then a next RFID label T is produced by cutting them with the cutter 15 to produce RFID labels one by one according to a control flow shown in FIG. 10, 11 or 14, the tag label tape 110 (in other words, the print-receiving tape 103 and the base tape 101) is transported under control to a position determining reference position PL, which has a predetermined positional relation to a corresponding RFID circuit element To (the labels T are forcibly transported to the position determining reference position PL one by one for positioning).

More specifically, in the modification, the cutting position and the print start position described in the above embodiment are determined using the positioning reference position PL as a reference based on the positioning mark PM in FIG. 16. The cutting position of the printed tag label tape 110 was located at any position when the RFID label T was produced last time, the tape 110 is first transported (that is, the portion from the previous cutting position to the position is a surplus portion) until the cutter 15 faces the positioning reference position PL (until the sensor 19 detects the positioning mark PM, that is, the portion from the previous cutting position to the position is a surplus portion). Then, the cutting position of the tag tape 110 for the printed tag label is calculated such that it corresponds to a predetermined label length L from the positioning reference position PL (in the example, it is approximately the same as pitches p at which the RFID circuit elements To are disposed).

The example of FIG. 16 shows a state in which the sensor 19 detects the positioning mark PM when the tag label tape 110 is transported a little from the cutting position at which a RFID label T was produced last time, and, the positioning reference position PL facing the cutter 15 at the time is set as a reference position for setting the label length L when a RFID label T is produced this time. A position CL, at which cutting is to be carried out, is set by counting the predetermined label length L from the positioning reference position PL.

The modification arranged as described above can obtain the following advantages in addition to the advantage similar to the above embodiment. More specifically, since each time one RFID label T is produced, the tape 110 is transported to the position determining reference position PL having the predetermined positional relation to the RFID circuit element (To) of a next RFID label T and cued, a subsequent positioning control of the tape can be easily and simply carried out to subject the tape to print, cut, and the like. Further, since each time a RFID label T is produced, the tape 110 is transported to the position determining reference position PL, even if a minute transport error, positional error, and the like occur in print, cut, and the like of one RFID label T, the adverse affect of them can be eliminated before a next RFID label T is produced by forcibly transporting the tape 110 to the position determining reference position PL, thereby pinpoint positioning control can be carried out securely.

(5) Others:

Note that, in the above embodiment and the modifications (1), (2), (3), (4), the distances from the pressure bonding roller 107 to the antennas 14, 14', 14" or the print head 10 are set to approximately the same distances along the tape transport direction. However, the present invention is not limited thereto and the distances of straight lines from the pressure bonding roller 107 to them may be set to approximately the same distance. In short, it is sufficient that print operation and read or write operation be carried out approximately at the same time and the respective tapes be not almost transported during the operations.

Further, in the above embodiment and the modifications, the example in which the RFID control information is read from and written and printed to the tapes 101, 101' and 103, 103' moving in the cartridges 100, 100-1, and the like. However, the present invention is not limited thereto, and print operation and read or write may be carried out by stopping the tapes at predetermined positions (further, read/write may be carried out in a state in which the tapes are held by a predetermined transport guide).

Further, it is assumed that the "Scroll All ID" signal, the "Erase" signal, the "Verify" signal, the "Program" signal, the "Kill" signal, and the like used above are complied with a specification developed by EPC global. EPC global is a non-profit corporation established by International EAN Association as an international distribution code organization and Uniformed Code Council (UCC) as a user site distribution code organization in cooperation with each other. Note that a signal complied with other standard may be used as long as it achieves a similar function.

Although not exemplified in detail, the present invention is embodied by being modified within a scope that does not depart from the gist thereof.

What is claimed is:

1. A label producing apparatus comprising:

a bonding device configured to produce a tag label tape by bonding a print-receiving tape paid out from a print-receiving tape roll and a base tape paid out from a base tape roll;

a communication information creating device configured to create RFID control information for carrying out communication to a plurality of RFID circuit elements disposed on one of said print-receiving tape and said base tape, the plurality of RFID circuit elements comprising a plurality of IC circuit parts for storing information and a plurality of tag antennas for transmitting and receiving information, each of said plurality of tag antennas is connected to a corresponding one of said plurality of IC circuit parts;

a device antenna configured to communicate with said IC circuit parts by transmitting said RFID control information created by said communication information creating device to said tag antenna by wireless communication, disposed upstream of said bonding device in the transport direction of any one of said print-receiving tape and said base tape; and a printing device configured to carry out print corresponding to said RFID circuit element to said print-receiving tape, disposed upstream of said bonding device in the transport direction of said print-receiving tape, wherein said device antenna and said printing device are disposed, such that distances thereof to said bonding device are about the same.

2. The label producing apparatus according to claim 1 wherein:

said device antenna is disposed upstream of said bonding device in the transport direction of said base tape having said plurality of RFID circuit elements.

3. The label producing apparatus according to claim 2 wherein:

said base tape comprises:

an adhesive layer for bonding labels, which include said RFID circuit elements and to which print is carried out, to a target to be bonded; and a separation material which covers the bonding side of said adhesive layer and is separated when the labels are bonded.

4. The label producing apparatus according to claim 3, further comprising:

a detecting device configured to detect an identifier disposed to a position of said separation material corresponding to a position at which said RFID circuit element is disposed;

a cutter configured to cut said tag label tape at a predetermined position; and a controller configured to feed said tag label tape to a position determining reference position having a predetermined positional relation to said RFID circuit element to be provided with the another label, when one label is produced by being cut with said cutter and then another label is to be produced.

5. The label producing apparatus according to claim 1 wherein:

said device antenna is disposed upstream of said bonding device in the transport direction of said print-receiving tape having said plurality of RFID circuit elements.

6. The label producing apparatus according to claim 1 wherein:

said device antenna is disposed in the vicinity of a surface intersecting a tape surface of the transport path of any one of said print-receiving tape and said base tape from said print-receiving tape roll or said base tape roll around which any one of the tapes is wound to said bonding device.

7. The label producing apparatus according to claim 1 wherein:

said device antenna is disposed in the vicinity of a surface parallel to a tape surface of the transport path of any one of said print-receiving tape and said base tape from said print-receiving tape roll or said base tape roll around which any one of the tapes is wound to said bonding device.

8. The label producing apparatus according to claim 1, further comprising a cartridge holder in which a cartridge is detachably disposed which includes said print-receiving tape roll, said base tape roll, and a guide device configured to guide the transport path of any one of said print-receiving tape and said base tape paid out from said print-receiving tape roll or said base tape roll so that the distance between the transport path and said device antenna is regulated to a predetermined range.

9. The label producing apparatus according to claim 8 wherein:

the cartridge comprises shield member configured to reduce leakage of a radio signal from said device antenna to the side of said print-receiving tape roll or said base tape roll around which any one of the tapes is wounded in the transport path of the tape.

10. The label producing apparatus according to claim 1 wherein:

said device antenna is a patch antenna having directivity on one side.

11. The label producing apparatus according to claim 1 wherein:

said communication information creating device creates RFID control information to be written to said IC circuit part of said RFID circuit element disposed to any one of said print-receiving tape and said base tape; and said device antenna transmits said RFID control information created by said communication information creating device to said tag antenna by wireless communication and writes the information to said IC circuit part.

* * * * *